(12) United States Patent
Wilson

(10) Patent No.: US 11,444,776 B2
(45) Date of Patent: Sep. 13, 2022

(54) BLOCKCHAIN WITH DAISY CHAINED RECORDS, DOCUMENT CORRAL, QUARANTINE, MESSAGE TIMESTAMPING, AND SELF-ADDRESSING

(71) Applicant: Kelce S. Wilson, Murphy, TX (US)

(72) Inventor: Kelce S. Wilson, Murphy, TX (US)

( * ) Notice: Subject to any disclaimer, the term of this patent is extended or adjusted under 35 U.S.C. 154(b) by 123 days.

(21) Appl. No.: 16/848,759

(22) Filed: Apr. 14, 2020

(65) Prior Publication Data
US 2020/0244463 A1    Jul. 30, 2020

Related U.S. Application Data

(60) Provisional application No. 62/980,467, filed on Feb. 24, 2020, provisional application No. 62/841,406, filed on May 1, 2019.

(51) Int. Cl.
| | | |
|---|---|---|
| *H04L 29/06* | (2006.01) | |
| *H04L 9/32* | (2006.01) | |
| *H04L 9/06* | (2006.01) | |

(52) U.S. Cl.
CPC .......... *H04L 9/3239* (2013.01); *H04L 9/0637* (2013.01); *H04L 9/3297* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 4,074,066 A | * | 2/1978 | Ehrsam | H04L 9/0637 380/37 |
| 4,309,569 A | * | 1/1982 | Merkle | H04L 9/3247 713/180 |

(Continued)

OTHER PUBLICATIONS

Brookings; Beyond bitcoin: The future of blockchain and disruptive technologies; Jan. 14, 2006; printed on Jan. 27, 2016; 3 pages; available at http://www.brookings.edu/events/2016/01/14-beyond-bitcoin-blockchain-disruptive-financial-technologies.

(Continued)

*Primary Examiner* — Jeremy S Duffield
*Assistant Examiner* — Hassan A Hussein
(74) *Attorney, Agent, or Firm* — Kelce S. Wilson

(57) ABSTRACT

Permissioned blockchains with off-chain storage establish integrity and no-later-than date-of-existence for documents, leveraging records containing hash values of documents. When a document's integrity or date is challenged, a new hash value is compared with a record in the blockchain. Proving date-of-existence (via hash value in a publication and/or SMS) for the block containing the record establishes no-later-than date-of-existence for the document. Permissioning monetizes operations, enforcing rules for submission rights and content, thereby precluding problematic material (privacy, obscenity, malicious logic, copyright violations) that threatens long-term viability. Compact records and off-chain storage in a document corral (with quarantine capability) preserve document confidentiality and ease storage burdens for distributed blockchain copies. Using multiple hash values for each document hardens against preimage attacks with quantum computing. Daisy chaining records establishes that relationships existed among documents at registration. Self-addressed blockchain registration (SABRe) permits documents to self-identify their blockchain record address (block ID, index).

21 Claims, 26 Drawing Sheets

(56) References Cited

U.S. PATENT DOCUMENTS

| | | | | |
|---|---|---|---|---|
| 5,136,646 | A * | 8/1992 | Haber | H04L 9/3265 713/177 |
| 5,136,647 | A * | 8/1992 | Haber | H04L 9/3297 713/178 |
| 5,530,757 | A * | 6/1996 | Krawczyk | H04L 9/085 713/161 |
| 5,781,629 | A * | 7/1998 | Haber | H04L 9/3236 713/177 |
| 5,832,502 | A * | 11/1998 | Durham | G06F 16/38 |
| 6,044,350 | A * | 3/2000 | Weiant, Jr | G06Q 20/3821 705/76 |
| 6,233,340 | B1 * | 5/2001 | Sandru | G06Q 20/04 283/73 |
| 6,237,096 | B1 * | 5/2001 | Bisbee | G06Q 20/389 713/176 |
| 6,285,999 | B1 * | 9/2001 | Page | G06F 16/951 707/999.005 |
| 6,321,339 | B1 * | 11/2001 | French | G06F 21/33 726/2 |
| 6,327,656 | B2 * | 12/2001 | Zabetian | G06Q 20/401 713/168 |
| 6,381,696 | B1 * | 4/2002 | Doyle | G06F 21/64 713/168 |
| 6,549,624 | B1 | 4/2003 | Sandru | |
| 6,584,565 | B1 * | 6/2003 | Zamek | H04L 9/3263 713/157 |
| 6,792,110 | B2 * | 9/2004 | Sandru | H04L 9/3247 283/73 |
| 6,799,176 | B1 | 9/2004 | Page | |
| 7,058,628 | B1 | 6/2006 | Page | |
| 7,203,838 | B1 * | 4/2007 | Glazer | H04L 9/3247 713/176 |
| 7,269,587 | B1 * | 9/2007 | Page | G06F 16/3346 |
| 9,679,276 | B1 * | 6/2017 | Cuende | G06F 16/9014 |
| 10,404,467 | B1 * | 9/2019 | Winarski | H04L 9/0618 |
| 10,608,910 | B2 * | 3/2020 | Moeller | G06Q 10/0832 |
| 10,615,960 | B2 * | 4/2020 | Zhang | H04L 9/0643 |
| 10,860,659 | B1 * | 12/2020 | Verma | H04L 9/3239 |
| 10,929,473 | B2 * | 2/2021 | Bier | G06F 16/90335 |
| 11,062,042 | B1 * | 7/2021 | McKervey | G06F 16/245 |
| 11,145,017 | B1 * | 10/2021 | Wu | G06F 21/64 |
| 2002/0023220 | A1 * | 2/2002 | Kaplan | H04L 9/3247 713/176 |
| 2002/0169971 | A1 * | 11/2002 | Asano | G11B 20/0021 713/193 |
| 2003/0023847 | A1 * | 1/2003 | Ishibashi | G11B 20/0021 713/169 |
| 2003/0028774 | A1 * | 2/2003 | Meka | H04L 9/3231 713/176 |
| 2003/0130032 | A1 * | 7/2003 | Martinek | G07F 17/3232 463/29 |
| 2003/0145206 | A1 * | 7/2003 | Wolosewicz | G06F 21/64 713/176 |
| 2004/0080777 | A1 * | 4/2004 | Smith | H04N 1/4486 358/1.14 |
| 2004/0093493 | A1 * | 5/2004 | Bisbee | G06Q 20/389 713/156 |
| 2004/0230572 | A1 * | 11/2004 | Omoigui | G06F 16/36 |
| 2005/0149739 | A1 * | 7/2005 | Hopkins | H04L 9/0894 713/184 |
| 2005/0283442 | A1 * | 12/2005 | Powell | G06Q 20/382 705/64 |
| 2006/0041550 | A1 * | 2/2006 | Bennett | G06F 16/9535 707/999.005 |
| 2006/0277459 | A1 * | 12/2006 | Lemoine | G06F 40/154 715/234 |
| 2007/0174865 | A1 * | 7/2007 | Jing | H04N 21/4756 725/28 |
| 2008/0016358 | A1 * | 1/2008 | Filreis | H04L 63/123 713/176 |
| 2008/0091954 | A1 * | 4/2008 | Morris | H04L 9/3236 713/176 |
| 2008/0195543 | A1 * | 8/2008 | Turner | G06Q 50/26 705/50 |
| 2017/0228731 | A1 * | 8/2017 | Sheng | G06Q 20/382 |
| 2017/0366353 | A1 * | 12/2017 | Struttmann | H04L 9/0618 |
| 2018/0089041 | A1 * | 3/2018 | Smith | G06F 16/2455 |
| 2018/0189638 | A1 * | 7/2018 | Nurvitadhi | G06N 3/063 |
| 2018/0211467 | A1 * | 7/2018 | Babic | G07C 13/00 |
| 2018/0247302 | A1 * | 8/2018 | Armstrong | G06Q 20/389 |
| 2018/0288019 | A1 * | 10/2018 | Dinia | H04L 63/083 |
| 2019/0108518 | A1 * | 4/2019 | Asif | G06Q 20/405 |
| 2019/0268162 | A1 * | 8/2019 | Sahagun | H04L 9/3239 |
| 2019/0312863 | A1 * | 10/2019 | Chow | H04L 9/3247 |
| 2019/0354725 | A1 * | 11/2019 | Lowagie | H04L 9/3247 |
| 2020/0044831 | A1 * | 2/2020 | Soundararajan | H04L 9/3247 |
| 2020/0057869 | A1 * | 2/2020 | Wilke | H04L 9/3236 |
| 2020/0244470 | A1 * | 7/2020 | Ruckriemen | G06Q 50/18 |
| 2020/0252406 | A1 * | 8/2020 | Padmanabhan | H04L 9/3239 |
| 2020/0267163 | A1 * | 8/2020 | Wilson | H04L 9/3271 |
| 2020/0313851 | A1 * | 10/2020 | Mondello | H04L 9/0643 |
| 2020/0382277 | A1 * | 12/2020 | Kong | H04L 9/0637 |
| 2021/0232707 | A1 * | 7/2021 | Wilson | H04L 9/3297 |
| 2021/0243201 | A1 * | 8/2021 | Tandel | G06F 21/64 |
| 2021/0256007 | A1 * | 8/2021 | Wu | H04L 9/3239 |

OTHER PUBLICATIONS

Brookings; Beyond Bitcoin (conference agenda); Jan. 14, 2006; retrieved on Jan. 27, 2016; 2 pages; available at http://www.brookings.edu/~/media/events/2016/01/14-bitcoin/20160114-roundtable-agenda.pdf.

Law360; 4 Ways Bitcoin's Tech May Soon Change Lawyers' Lives; Feb. 10, 2016; available at Law360.com; printed on Feb. 16, 2016; 3 pages.

Law360; Blockchain: Preparing For Disruption Like It's The '90s; Mar. 14, 2016; available at Law360.com; printed on Mar. 17, 2016; 4 pages.

Law360; An Inside Look At A Law Firm Diving Into Bitcoin Tech; Mar. 10, 2016; available at Law360.com; printed on Mar. 14, 2016; 3 pages.

Belgian Federal Office for Scientific, Technical and Cultural Affairs; TIMESEC, Digital Timestamping and the Evaluation of Security Primitives; Dec. 1999; 11 pages.

H. Massias, X. Serret Avila, J.-J. Quisquater; Design Of A Secure Timestamping Service With Minimal Trust Requirement; published 1999; 8 pages; printed on Apr. 5, 2016 The 20th Symposium on Information Theory in the Benelux.

Guardtime; Black Lantern Cybersecurity Platform; date unknown; printed on Jul. 31, 2016; 6 pages; available at: https://guardtime.eom/cybersecurity-platform#ksi-service.

Guardtime; KSI Blockchain Technology; date unknown; printed on Jul. 31, 2016; 8 pages; available at: https://guardtime.com/technology/ksi-technology.

Guardtime; A Distributed Consensus Engine for Digital Transactions; date unknown; printed on Jul. 31, 2016; 4 pages; available at: https://guardtime.com/technology/ksi-ledger.

Haber, Stuart; Stornetta, W. Scott (Jan. 1991). "How to time-stamp a digital document". Journal of Cryptology. 3 (2): 99-111. Retrieved Jul. 4, 2017.

Bayer, Dave; Haber, Stuart; Stornetta, W. Scott (Mar. 1992). "Improving the Efficiency and Reliability of Digital Time-Stamping". Sequences. 2: 329-334. Retrieved Jul. 4, 2017.

Wikipedia; Timestamp; Feb. 27, 2007; available at http://en.wikipedia.org/wiki/Time_stamp; printed on Mar. 19, 2007; 3 pages.

E-Timestamp; How a digital timestamp works; date unknown; available at http://www.e-timestamp.com/timestamp.htm; printed on Apr. 22, 2007; 2 pages.

Wikipedia; Trusted timestamping; Apr. 1, 2008; available at http://en.wikipedia.org/wiki/Trusted_timestamping; printed on Apr. 1, 2008; 3 pages.

Speedylook Encyclopedia; Wrap Soleau; date unknown; available at http://www.speedylook.com/wrap_soleau.html; printed on Apr. 1, 2009; 1 page.

(56) References Cited

OTHER PUBLICATIONS

Data Formats of the NSRL Reference Data Set (RDS) Distribution; date unknown; printed on Jul. 19, 2011; 6 pages; available at http://www.nsrl.nist.gov/documents/Data-Formats-of-the-NSRL-Reference-Data-Set-12.pdf.
Satoshi Nakamoto; Bitcoin: A Peer-to-Peer Electronic Cash System; Oct. 31, 2008; 8 pages; available at https://bitcoin.org/bitcoin.pdf; printed on Jun. 2, 2015.
Cryptography@metzdowd.com mailing list; Bitcoin P2P e-cash paper (dated announcement of Satoshi Nakamoto Bitcoin paper); Oct. 31, 2008; printed on Apr. 5, 2016; 1 page; available at http://article.gmane.org/gmane.comp.encryption.general/12588/.
Wikipedia; Merkle Tree; available at https://en.wikipedia.org/wiki/Merkle_tree; printed on Sep. 30, 2018; 6 pages.

\* cited by examiner

BLOCKCHAIN WITH DAISY CHAINED RECORDS, DOCUMENT CORRAL, QUARANTINE, MESSAGE TIMESTAMPING, AND SELF-ADDRESSING

CROSS REFERENCE TO RELATED APPLICATIONS

This application claims the benefit of U.S. Provisional Patent Application No. 62/980,467, filed Feb. 24, 2020, entitled "Blockchain With Daisy Chained Records, Document Corral, Quarantine, Message Timestamping, And Self-Addressing", the entirety of which is hereby incorporated by reference herein; and also claims the benefit of U.S. Provisional Patent Application No. 62/841,406, filed May 1, 2019, entitled "Blockchain With Daisy Chained Record References", the entirety of which is hereby incorporated by reference herein.

BACKGROUND

Blockchain records regarding documents are generally isolated entities. Thus, for off-chain storage, when a set of documents is registered in a blockchain using only hash values (as opposed to in-chain storage, in which the documents themselves are placed into the blockchain), information regarding the relationships of the documents is typically not included. Therefore, any third-party verification regarding the documents at a later time, that involves a determination of whether the document owner considered the documents to be related in some manner at the time of registration, may require that representations by the documents' owner be trusted at the time of verification. Although this is a minor point, it is nevertheless at least a blemish on the idea that blockchains provide "trust in the absence of a trusted entity", because at least one aspect of the document information (i.e., the existence of some relationship among different documents) cannot be verified in a truly independent manner.

This can become an issue when an arrangement involves multiple separate documents. Some (of many) example scenarios include: (1) real estate transactions; (2) sets of estate planning documents that include codicils for identifying specific bequests, powers of attorney, and others; (3) financial transactions involving multiple stages and/or accounts; and (4) patent cross-license deals with one document that addresses standard essential patents (SEPs) licensing terms, and a separate document that addresses patent licensing terms for non-SEPs. Patent cross-license deals may use separate documents because laws and typical licensing terms can differ widely regarding SEP and non-SEP licensing terms, and companies may become involved in a lawsuit over one class of patents, while the other class is covered by an existing license. The use of multiple documents in real estate transactions and estate planning is well-known. It would therefore, be beneficial to be able to identify that, at the time documents were registered in an off-chain storage blockchain (e.g., a blockchain that stored only document hash values, rather than the documents themselves), the documents were related as part of an identified set of documents.

BRIEF DESCRIPTION OF THE DRAWINGS

For a more complete understanding of the present invention, reference is now made to the following descriptions taken in conjunction with the accompanying drawings, in which.

Corresponding reference characters indicate corresponding parts throughout the drawings.

DETAILED DESCRIPTION OF THE INVENTION

Figure 1A:
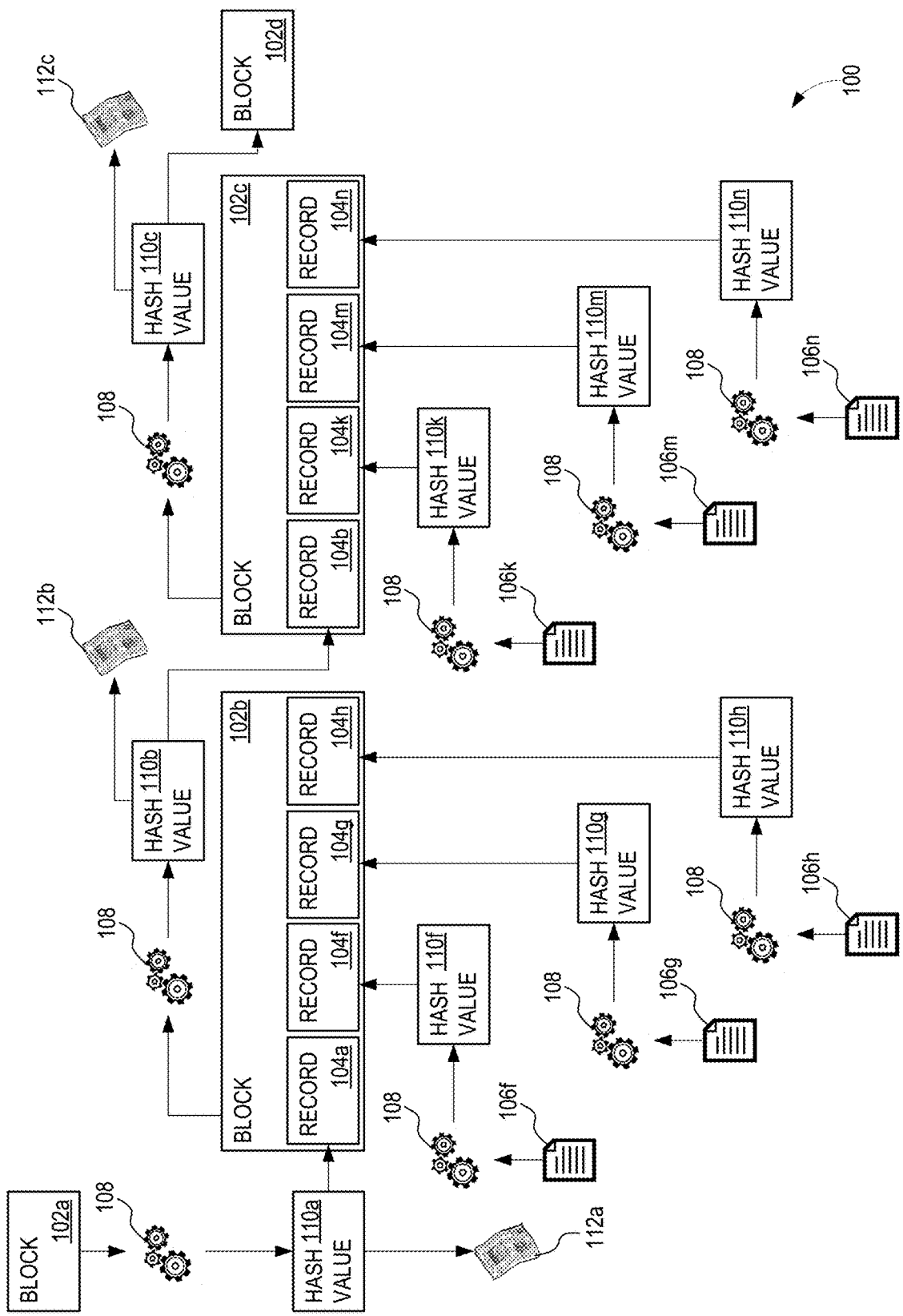
FIG. 1A illustrates the Public Electronic Document Dating List (PEDDaL®) blockchain.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Systems and methods are disclosed which use a blockchain (a.k.a. block chain or edition chain) to enable the establishment of integrity and no-later-than date-of-existence for documents (e.g., generic computer files) even for documents held in secrecy and those stored in uncontrolled environments. Daisy chained records permit linking various blockchain records, to establish that relationships between the various documents (represented by the records) had been asserted as of the date of registration (in the blockchain) of the documents. Example uses that may advantageously employ a blockchain with daisy chained record references include real estate transactions, estate planning, contract negotiations, financial transactions involving multiple stages and/or accounts, and complex deals that aggregate multiple individual documents.

A permissioned blockchain with off-chain storage establishes integrity and no-later-than date-of-existence for documents, leveraging records in which hash values represent documents. After registration, if a document's integrity or date is questioned, the document is hashed again and the new hash value is compared with the record. A provable date-of-existence for the block containing the record establishes a no-later-than date-of-existence for the document. Using multiple hash values renders preimage attacks into multi-dimensional problems, increasing security against quantum computing. If there is no challenge to the document, the document may remain private (confidential) indefinitely. Even if disclosure is needed to prove the document's age and integrity, in some scenarios, disclosure can be limited to an agreed set of trustworthy parties, without becoming public. Compact records and off-chain storage in a secure document corral preserve document confidentiality and ease storage burdens for the distributed blockchain. Permissioning monetizes operations and enforces record content rules, avoiding problematic material (e.g., obscene material, material posing privacy problems, intellectual property rights violations, and digital files containing malicious logic) to ensure long-term viability. That is, the permissioning entity can bar blockchain entries that contain material other than hashes, timestamps, and other authorized data fields, in the correct location with proper content. Thus, obscene and illegal material can be kept out. Additionally, the permissioning entity can limit submissions to submitters who have paid the required fee and/or belong to the proper group (e.g., industry sector) that is serviced by the blockchain. The priority parent application preceded Bitcoin; earlier terms for "block" and "block chain" are "edition" and "edition chain." Daisy chaining records establishes that relationships existed among various documents as of the blockchain registration dates and can be used to identify when a set of documents, that had been registered in a blockchain with an indication of a relationship among the set, is missing one or more of the documents.

Additional benefits of the disclosure include a blockchain for which document protection persists beyond the cessation of operations by any business associated with producing the blockchain. No one involved with the disclosed blockchain can either falsify date proof (of any document that did not actually exist as of the provable date-of-existence) or deny date proof for any document with a corresponding record appearing within the blockchain. Thus, any employee of a permissioning entity being accused of corruption does not taint the proofs offered by the blockchain. Verification of a no-later-than date of existence for a document can be accomplished by anyone, without the need for special software to read the blockchain or locate records—contingent only on a copy of the document at issue being available for hashing. Thus, when combined with the off-chain storage, significantly reduced storage requirements, and the benefits of the permissioning entity precluding problematic material, a long-life blockchain is possible. Additional disclosure assists with keeping blockchain operations compliant with legal requirements when an enforceable court order requires deletion of certain material (e.g., a "right to be forgotten" as identified in the General Data Protection Regulation (GDPR)). Such compliance is challenging, if not possible for on-chain storage blockchains, such as used by Bitcoin and Ethereum.

The daisy chain capability enhances other aspects of the disclosure, such as the use of a document corral, a document quarantine (for items not permitted to remain within a document corral), the use of parallel (different speed) blockchains, and a unique self-addressed blockchain registration (SABRe) capability that enables a document to identify the location of its record within a blockchain, and yet still produce a hash value (message digest) that is within the record it references. Daisy chaining enables identification of sets of documents within a document corral, without either bloating the blockchain or requiring an external data item to track. Daisy chaining also enables identification of the disposition of quarantined documents. Further, daisy chaining also enables identifying an earlier date-of-existence for "early" documents that leverage the advantageous SABRe capability.

Although various novel concepts are introduced separately, they are compatible with each other. Therefore it is specifically contemplated that combinations will be formed, such as by intermixing ideas and components introduced by any of the figures. That is, examples associated with FIGS. 1A-3 may be combined with one or more portions of any ideas associated with the other figures.

Figure 1B:
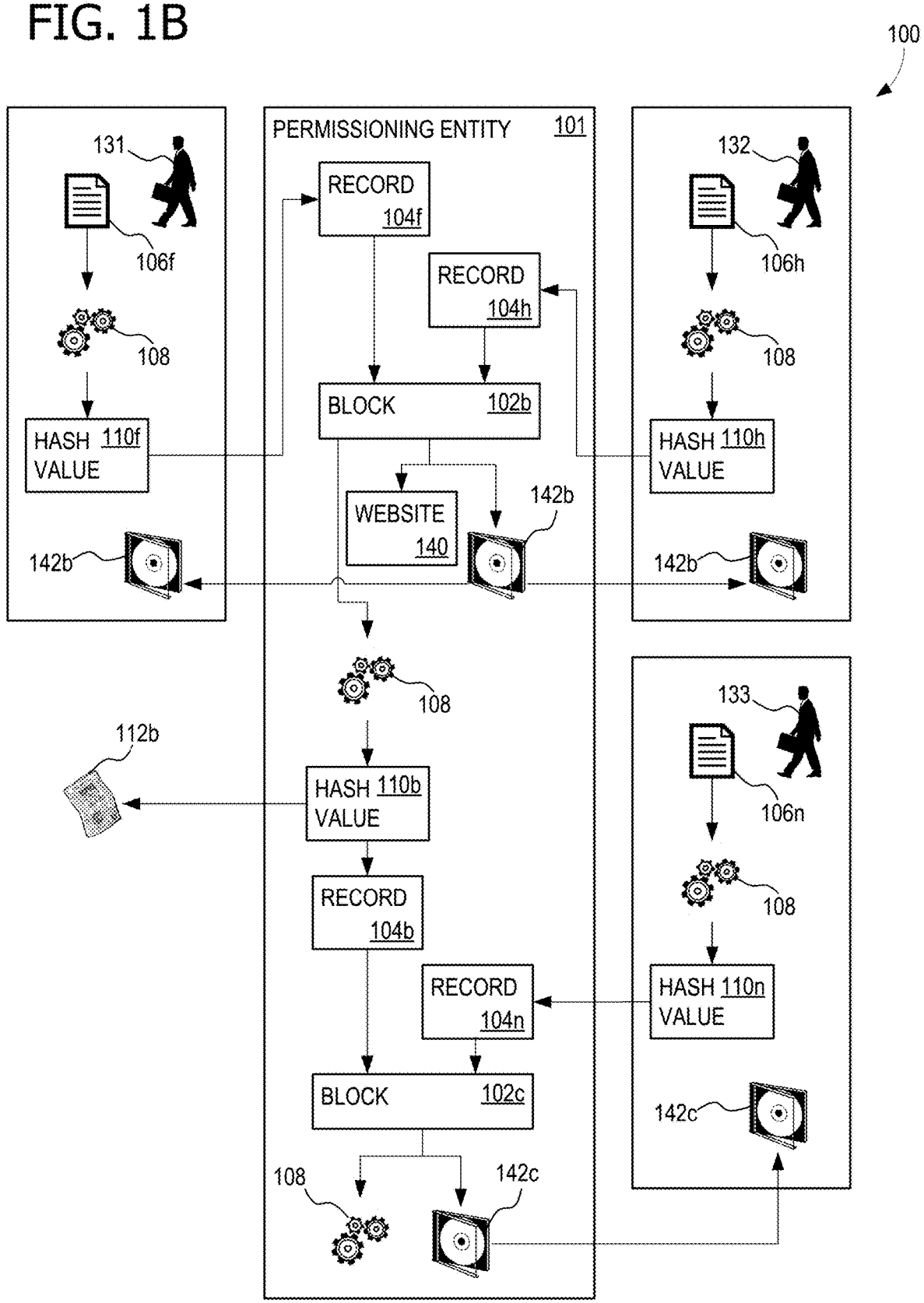
FIG. 1B illustrates an equivalent representation of the PEDDaL® blockchain.

FIG. 1A and FIG. 1B illustrate the Public Electronic Document Dating List (PEDDaL®) blockchain in differing representations. FIGS. 1A and 1B should be viewed together for the following description: A permissioning entity 101 generates a blockchain 100 on a schedule for the benefit of submitters 131, 132, and 133. Permissioning entity 101 is named so, because it grants permission for records to be included within blockchain 100. Reasons for using a permissioning entity include monetizing the blockchain, by permitting only paying submitters to add to blockchain 100, and enforcing record content (e.g., ASCII hex characters only, with 256-character record lengths), to preclude potentially problematic material (e.g., obscene material, material posing privacy problems, intellectual property rights violations, and digital files containing malicious logic) from entering blockchain 100.

A primary difference between a permissioning entity and a trusted entity is that, whereas a trusted entity (e.g., a trusted timestamping entity, document escrow agent) must be trusted to represent critical facts truthfully and accurately, in order to establish a no-later-than date-of-existence and integrity for a challenged document, there is no need to trust a permissioning entity. For scenarios in which a trusted entity is needed, document challengers and arbiters must trust the trusted entity and, if the trusted entity's assertions are incorrect (i.e., the trusted entity is dishonest or even simply making an honest error) the trusted entity might falsify the proof—either improperly denying a correct no-later-than date-of-existence and integrity for a document, or improperly attesting to an incorrect no-later-than date-of-existence and integrity for a document. For scenarios in which a trusted entity is not needed, but a permissioning entity is needed, failures by the permissioning entity, whether due to dishonesty or simple mistake, result in significantly less serious consequences: a record is not entered into the blockchain in a timely manner, and/or records are entered into the blockchain that fail the criteria for inclusion.

If a permissioning entity makes repeated mistakes of not including records in a timely manner, the utility of the blockchain for protecting the documents already registered is not lessened. Document owners, who have already registered documents, are still safe. New documents can be submitted to a different blockchain with, hopefully, a better permissioning entity. In stark contrast, for trust arrangements requiring the use of a trusted entity, a single act of dishonesty by the trusted entity can threaten the protection of all documents. Document owners, who have already registered documents, may lose all their ability to establish no-later-than dates-of-existence and integrity for their registered documents. This is a tragic situation, and a serious risk presented by using trust mechanisms that rely on trusted entities.

Another difference between a permissioning entity and a trusted entity is that, if the trusted entity ceases operations, document owners, who have already registered documents, may lose all their ability to establish no-later-than dates-of-existence and integrity for their registered documents in this scenario, also. In stark contrast, if a permission entity ceases operations, the consequence is limited to document owners not being able to register new documents into the blockchain whereas, for previously-registered documents, no-later-than dates-of-existence and integrity remain safely verifiable. Thus, there is an additional risk factor for systems that use trusted entities, to which systems that need only permissioning entities are not susceptible. The basic issue is that trust in a trusted entity is critical, because a trusted entity can affect proof regarding already-registered documents, whereas a permissioning entity cannot affect proof regarding already-registered documents, in the examples disclosed herein.

Description of blockchain 100 will begin with an intermediary block 102b, that is neither the initial block nor the final block in blockchain 100. In some examples, the operations described herein, associated with blockchain 100, are performed using one or more computing devices 2500 of FIG. 25. Block 102b includes records 104a, 104f, 104g, and 104h. Record 104a represents prior block 102a, and is used to chain block 102a with block 102b. Block 102a is hashed with an integrity verification code (IVC) generator 108 to generate hash value 110a. In some examples, and IVC comprises a complete message digest; in some examples, an IVC comprises a partial message digest; in some examples, an IVC comprises two message digests; and in some examples, an IVC comprises a mixture of partial and complete message digests. In some examples, hash value 110a includes one or more of the Secure Hash Algorithm 512 (SHA-512) message digest, the SHA-1 message digest, and the SHA-256 message digest. The use of multiple message digests renders blockchain 100 more resistant to second preimage attacks, which may become a threat to some blockchains in the era for quantum computers and quantum computing. It should be understood that hash value 110a may alternatively represent any value that can indicate integrity of a digital bit stream, such as cyclic redundancy checks, checksums, and others. In order to establish a no-later-than date-of-existence for block 102a, hash value 110a is published in a public record 112a, for example in an advertisement in a printed publication. In some examples, the Marketplace section of classified advertisements in the USA Today newspaper is used a public record.

Multiple documents 106f, 106g, and 106h are to be registered in blockchain 100, specifically, block 102b. Therefore, each of documents 106f, 106g, and 106h is hashed (or some other integrity verification code operation is performed) by IVC generator 108 to generate hash values 110f, 110g, and 110h, respectively. These are then entered into records 104f, 104g, and 104h, respectively, as is described in further detail with respect to FIGS. 3, 4, 9 and 10. Block 102b is then closed, which means that no further records can be added, and published in one or more public locations, such as on a website 140 (see FIG. 1B) and/or transmitted to a plurality of dispersed blockchain nodes. Also, in some examples, block 102b is written to a fixed media 142b, such as a DVD, and distributed (see FIG. 1B). Distribution of fixed media 142b may include sending copies to submitters 131, 132, who submitted records to block 102b, as well as other archival locations, such as libraries and document archival services.

Block 102b is then hashed by IVC generator 108 to generate hash value 110b, which is entered into record 104b in a block 102c. Block 102c is subsequent to block 102b, and record 104a, which represents block 102b, is used to chain block 102b with block 102c. Additionally, in order to establish a no-later-than date-of-existence for block 102b, hash value 110b is published in a public record 112b, for example in another advertisement in a printed publication. In some examples, public record 112a and public record 112b are published the same day (e.g., separate classified ads in the same newspaper edition). In some examples, public record 112a and public record 112b are published on different days, with public record 112b following public record 112a.

The process repeats for documents 106k, 106m, and 106n to be registered in blockchain 100, specifically, block 102c. Therefore, each of documents 106k, 106m, and 106n is hashed by IVC generator 108 to generate hash values 110k, 110m, and 110n, respectively. These are then entered into records 104k, 104m, and 104n, respectively. Block 102c is then closed and published in one or more public locations, such as on a website 140 and/or transmitted to a plurality of dispersed blockchain nodes. Also, in some examples, block 102b is written to a fixed media 142c, such as a DVD, and distributed (see FIG. 1B). Distribution of fixed media 142c may include sending copies to submitter 133, who submitted a record to block 102c, as well as other archival locations, such as libraries and document archival services. Block 102c is then hashed by IVC generator 108 to generate hash value 110c, which is entered into a record (not illustrated) in a block 102d. Block 102d is subsequent to block 102c, and the record which represents block 102c, is used to chain block 102c with block 102d. Additionally, in order to establish a no-later-than date-of-existence for block 102c, hash value 110c is published in a public record 112c, for example in another advertisement in a printed publication. In some examples, public record 112b and public record 112c are published the same day (e.g., separate classified ads in the same newspaper edition). In some examples, public record 112b and public record 112c are published on different days, with public record 112c following public record 112b.

Figure 2:
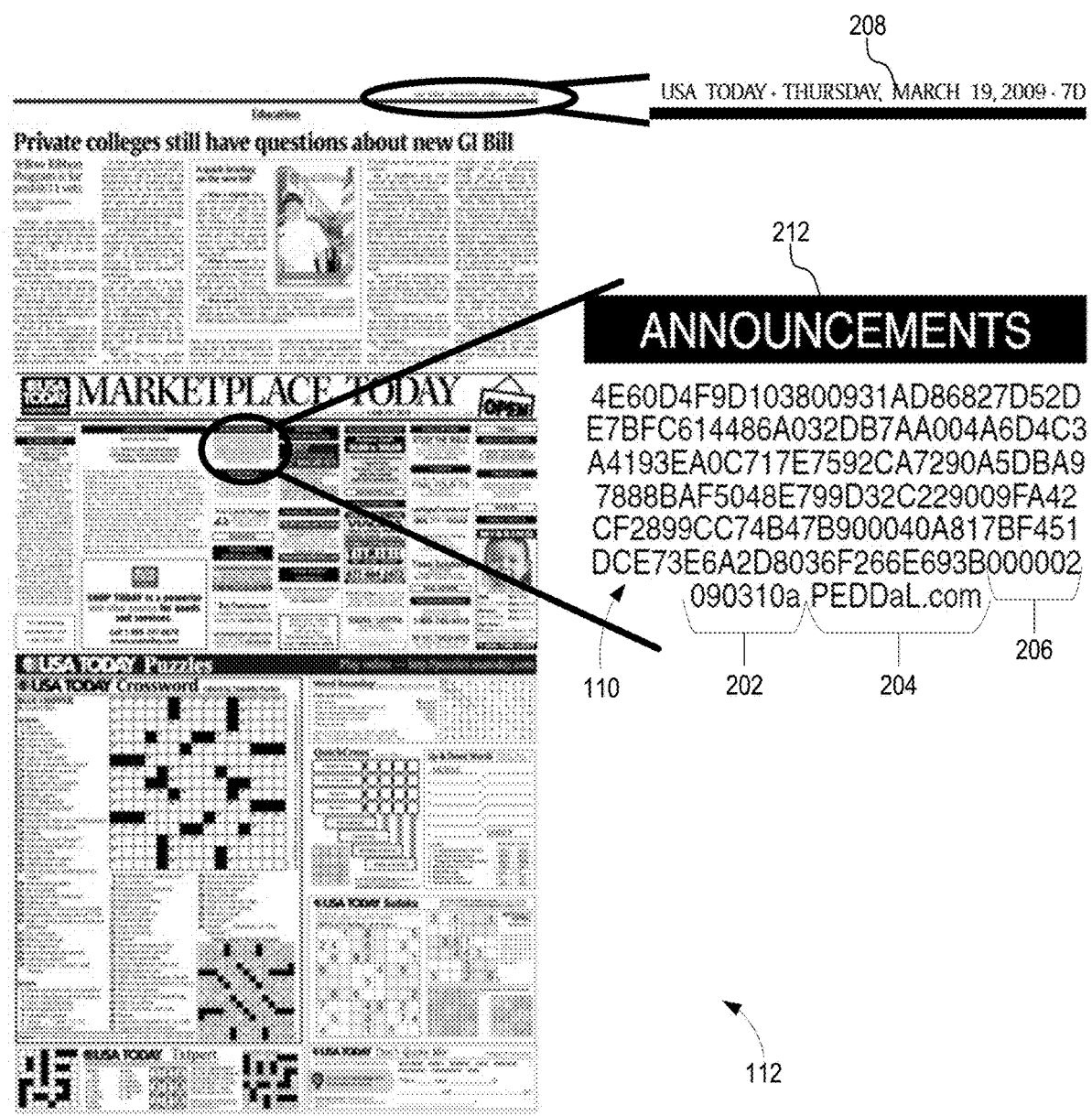
FIG. 2 illustrates a public record that establishes a no-later-than date-of-existence for a PEDDaL® block.

FIG. 2 illustrates a public record 112 that establishes a no-later-than date-of-existence for a PEDDaL® block, specifically a block identified as 090310a, which existed no later than Mar. 19, 2009. Public record 112 is a real public record for a real block. Therefore, the PEDDaL® blockchain is able to prove a no-later-than date-of-existence for files as early as Mar. 19, 2009. A classified ad 212 includes a hash value 110, which is the SHA-512 message digest, followed by the SHA-1 message digest for PEDDaL® block 090310a. The block identification is shown in a field 202; a field 204 indicates a website (for example, website 140 of FIG. 1B) where a copy of PEDDaL® block 090310a can be obtained. A generator version field 206 indicates a generator version used to generate hash value 110. Using the generator version information, the specific hash functions used can be identified. When different hash functions are used, the generator version information will change, although it is possible for the generator version information will change even when the hash functions used remain unchanged.

A date field 208 indicates the date of publication of public record 112, and therefore, establishes the no-later-than date-of-existence for a PEDDaL® block 090310a as Mar. 19, 2009. Because the specific public record (classified ad 212 within the USA Today newspaper) was published to large base of readers, who would have noticed if date field 208 had been incorrect, after publication and distribution, the date in date field 208 became a trustworthy date.

Figure 3:
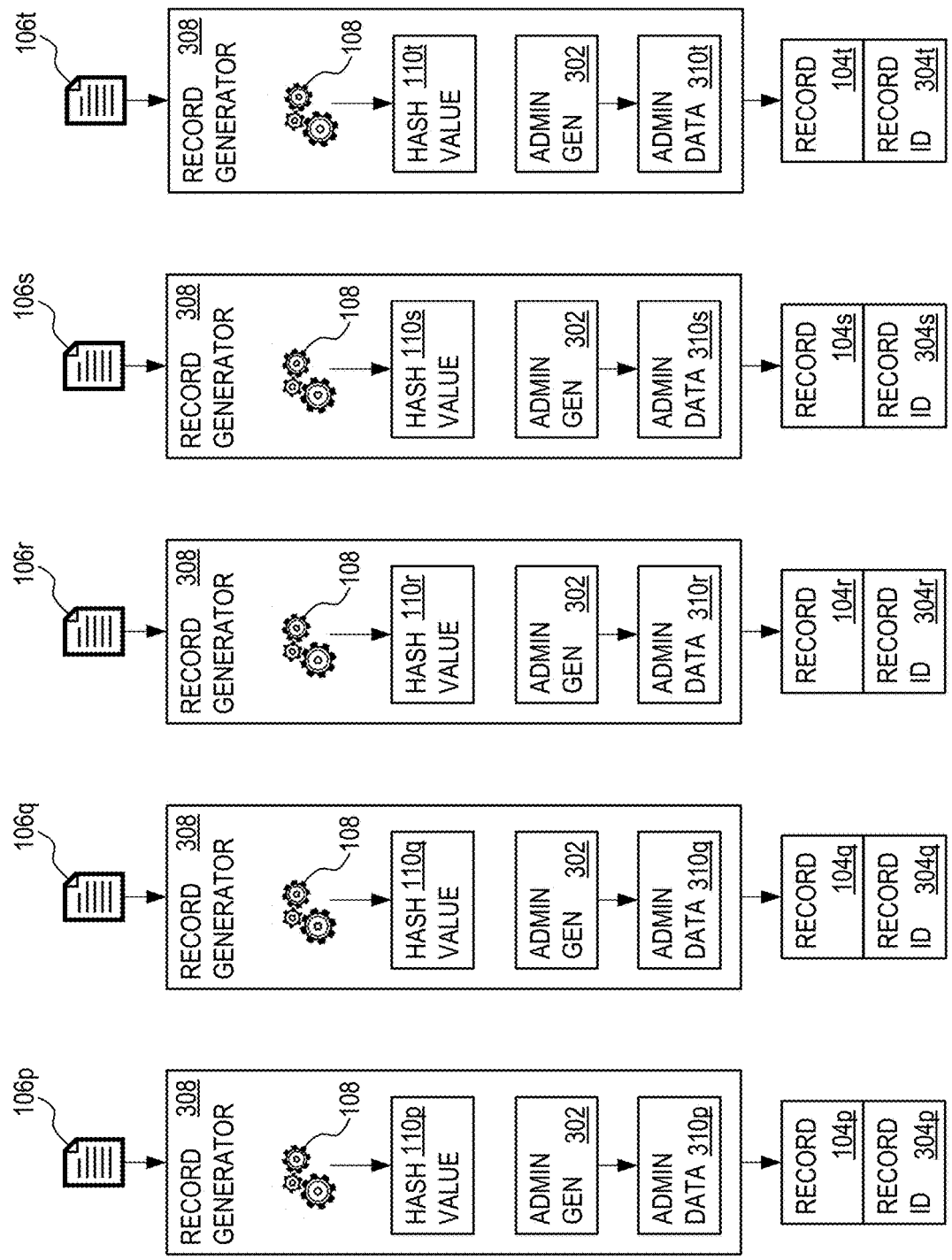
FIG. 3 illustrates generation of blockchain records.

FIG. 3 illustrates generation of blockchain records 104p, 104q, 104r, 104s, and 104t (104p-104t) from documents 106p, 106q, 106r, 106s, and 106t (106p-106t), respectively, using a record generator 308. The generation of other records shown in other figures herein (e.g., records 104a-104d, 104f-104h, 104k, 104m, and 104n) is similar. Document 106p is hashed by IVC generator 108 within record generator 308, to produce hash value 110p. An administrative data generator 302, also within record generator 308, generates administrative data 310p. Exemplary administrative data 310p includes a generator version number, a timestamp, and other data. Hash value 110p and administrative data 310p are combined (e.g., concatenated) to produce record 104p. As illustrated, records 104q-104t are generated similarly. A record identifier 304p is a unique identifier for record 104p. In some examples, record identifier 304p is the first hexadecimal octet of a SHA-1 message digest for document 106p. In some examples, record identifier 304p is used as a root filename for record 104p, combined with a file type extension such as, for example, ".pdl". There are also equivalent record identifiers 304q, 304r, 304r, and 304t, for records 104q, 104r, 104r, and 104t, respectively. Other records and record identifiers mentioned herein have a similar relationship.

Figure 4:
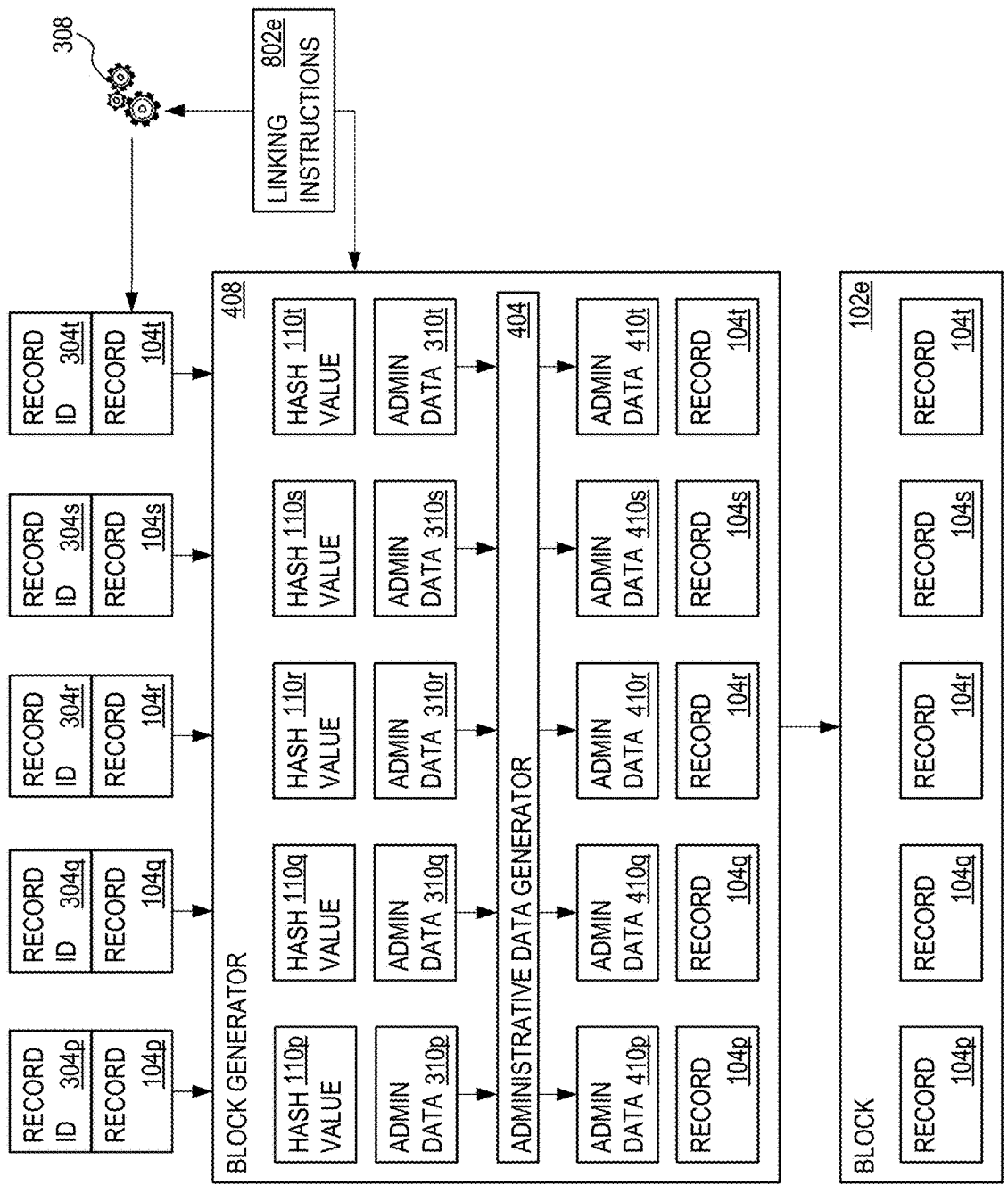
FIG. 4 illustrates generation of a block with daisy chained record references.

FIG. 4 illustrates generation of a block 102e with daisy chained record references. Records 104p-104t are received and provided to a block generator 408 (using record identifiers 304p-304t as filenames for records 104p-104t), along with linking instructions 802e, described in more detail with respect to FIG. 8. Block generator 408 identifies hash values 110p-110t and administrative data 310p, 310q, 310r, 310s, and 310t in records 104p, 104q, 104r, 104s, and 104t, respectively. An administrative data generator 404 uses administrative data 310p-310t to generate new administrative data 410p, 410q, 410r, 410s, and 410t, which may replace and/or add to information in administrative data 310p-310t. For example, a record index is added, and a digitally signed timestamp may also be added to indicate the time at which block 102e is compiled by block generator 408. Additionally, a linked record field is populated with linked record values, in accordance with linking instructions 802e. The updated records 104p-104t, having hash values 110p-110t and administrative data 410p-410t (in place of administrative data 310p-310t), are placed into block 102e. In some examples, record generator 308 intakes linking instructions 802e and generates records with linked record field already populated with linked record values. Thus, either record generator 308 or block generator 408 may populate linked record fields with linked record values.

Figure 5:
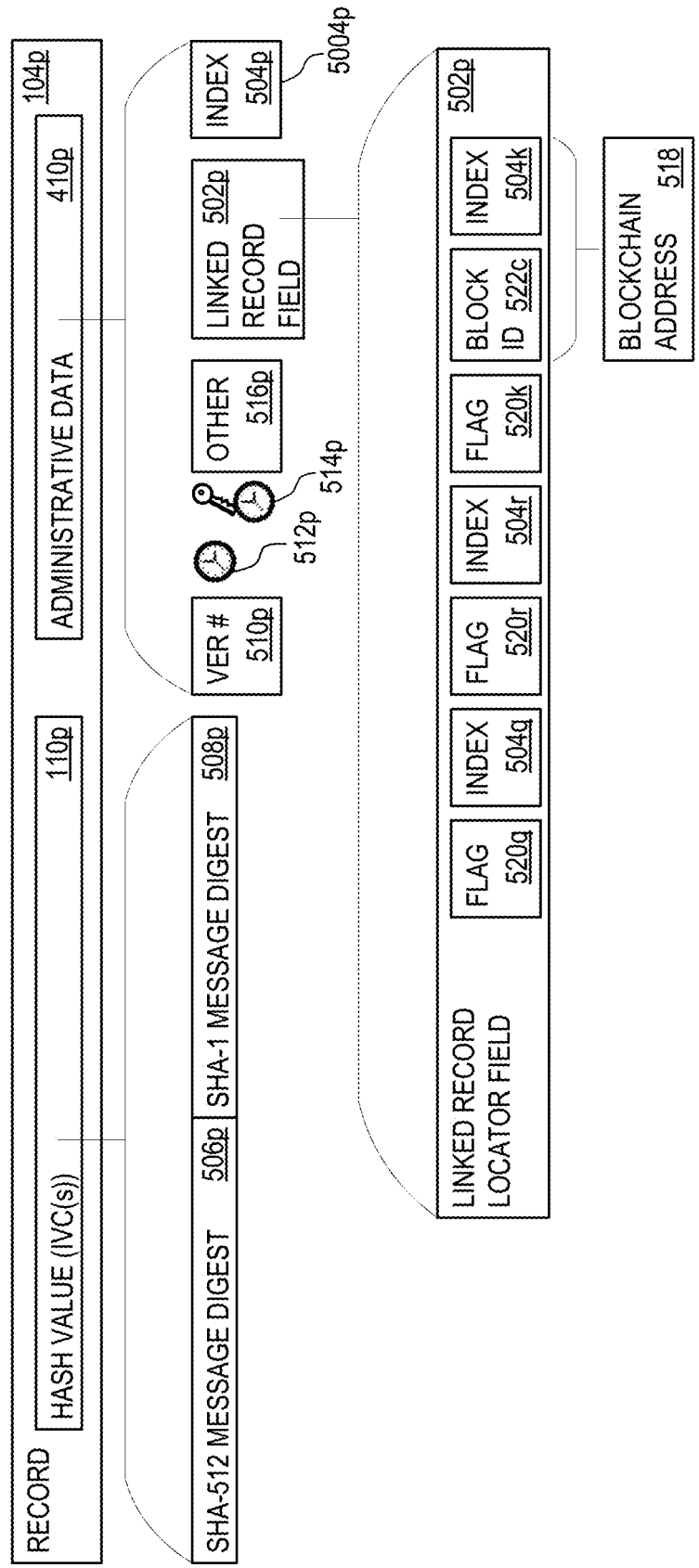
FIG. 5 illustrates fields of an exemplary blockchain record with daisy chained record references.

FIG. 5 illustrates fields of an exemplary blockchain record with daisy chained record references, specifically record 104p. As illustrated, record 104p is in a first defined format that includes hash value 110p followed by administrative data 410p, although other formats are possible. In some examples, the first format has a fixed number of bytes, such as 256 bytes. As indicated, hash value 110p includes a SHA-512 message digest (a first IVC value) in a first IVC portion 506p, followed by a SHA-1 message digest (a second IVC value) in a second IVC portion 508p (both for document 106p). This combination is 168 bytes long on machines having 4-bit bytes in the ASCII text file format, since the SHA-512 message digest is 512 bits and the SHA-1 message digest is 160 bits. Producing blockchain records and blocks in ASCII text file format doubles their size, relative to a binary file format, but permits inspection of the contents of both records and blocks with any ASCII text viewer, thereby precluding the need for proprietary software when independently verifying document registrations. It should be understood that other hash functions may also be used, for example SHA-256, and that some examples may use only a single IVC (hash value) or more than two IVCs. As used within record 104p, hash value 110p is an IVC field that has a first IVC value portion 506p a second IVC portion 508p.

Administrative data 410p includes generator version information 510p, a first timestamp in a first timestamp field 512p, a second timestamp in a second timestamp field 514p, other administrative data 516p, a linked record locator field 502p, and an index value in an index field 5004p. In some examples, second timestamp field 514p contains an encrypted timestamp from a trusted timestamping entity (a.k.a. trusted timestamping authority, TTA), for example encrypted with the trusted timestamping entity's private key, as a form of a digital signature of the timestamp. The index is to assist locating records within specific blocks. Together, a block identification and a record index specify a blockchain address 518, which provides the location of a record within blockchain 100. In some examples, record 104p has the following format in ASCII text:

Characters 1-128: SHA-512 message digest (representing 512 bits);
Characters 129-168: SHA-1 message digest (representing 160 bits);
Characters 169-170: 2-digit (hex) generator version (representing 8 bits);
Characters 171-178: 8-digit (hex) timestamp (representing 32 bits);
Characters 179-198: 20-digit padding with the ASCII character for zeros (reserved for future use);
Characters 199-250: linked record locater field, 4×13-digit linked record locators; and
Characters 251-256: 6-digit (hex) index of the position within the block (document dating list edition (in DDL file), using 1-based indexing.

Linked record locator field 502p indicates linked record values that indicate the location of other records (or a portion of the contents of the other records) in blockchain 100, and possibly also in different blockchains (i.e., blockchains other than blockchain 100). As indicated, linked record locator field 502p has a flag 520q, an index 504q, a flag 520r, an index 504r, a flag 520k, a block identification 522c, and an index 504k. Flag 520q indicates that the next bit field, containing index 504q indicates an index within the same block. Similarly, flag 520r also indicates that the next bit field, containing index 504r indicates an index within the same block. Index 504q is the index for record 104q, and index 504r is the index for record 104r. As can be seen in FIG. 4, records 104p, 104q, and 104r are all within the same block 102e. Optional flag 520k indicates that the next bit field, block identification 522c, indicates a different block than block 102e, so the next bit field, index 504k indicates an index within the referenced block. Index 504k is the index for record 104k, and block identification 522c holds the block identification of block 102c. As can be seen in FIG. 1, record 104k is within block 102c. In some examples, flags are optional. As one example, flags 520q and 520r comprise seven zeros to indicate that indices 504q and 504r are for records within the same block. Block ID 522c having non-zero values acts as sufficient indication that index 504k is for a different block, rendering flag 520k superfluous for this particular scheme.

In some examples, the flags may be combined with the block identification, such as by having a format with two bit fields: one for the block identification and one for the index. If the index is within the same block (e.g., the case for flags 520q and 520r, described above), the bit field for the block identification is padded with zeros. If the index is not within the same block (e.g., the case for flag 520k), the bit field for the block identification is populated with the block identification, which will be different than all zeros. Thus, in some examples, the flags are not dedicated bit fields, but are instead inferred from whether the block identification is padded with zeros or filled with non-zero values. In some examples, a flag indicating that the index is within the same block is shorter, such as a single character, for example the ASCII character for the number 0 (zero). In some examples, linked record locator field 502p has the following format in ASCII text:

Characters 199-211: 13-character linked record locator #4 (used last);
Characters 212-224: 13-character linked record locator #3;
Characters 225-237: 13-character linked record locator #2; and
Characters 238-250: 13-character linked record locator #1 (used first).

In some examples, the block identifications have the following format in ASCII text: YYMMDDa=seven (7) characters. In some examples, the indices have the following format in ASCII text: six (6) digit (hex) integer identifying the counted position of the record within the block. For example, an index of 000002 with 256-byte records (on a 1 character=1 byte machine) indicates that the record starts at character 257 within the block. With this scheme, each linked record value is 13 characters (7+6=13), although different formats and lengths are possible.

As an example, consider a 256-byte (256-character) record having the following set of characters in positions 199 through 256: "xxxxxx00 00000000 00018082 5A000999 180825A0 00998000 00123456 78000333", where x indicates unknown. The index is 0x333, indicates that these linked records appear within the 333$^{rd}$ record (in hexadecimal, 819 in decimal) in the block. The linked record locator field has three linked records, two within prior blocks, and one within the same block. The linked records in the prior blocks are in block 180825a, at index 0x998; and in block 180825a, at index 0x999. The index values are in hexadecimal, the decimal values are 2456 and 2457, respectively. The example linked record that is also within the same block is not referenced by index value (just for this example), but is instead referenced by a portion of the contents of that linked record. In some examples, the first octet (i.e., the first 8 characters) of the SHA-1 message digest of the other record is used as a reference or pointer to a linked record. Specifically, that linked record has the first octet identified as "12345678". In order to find that linked record in this scheme, the other records in the block are searched until a record is found that contains 12345678 in the position corresponding to the first 8 characters of the SHA-1 message digest. Since the octet is eight (8) characters in length, in order to preserve a 13-character scheme for a linked record locator field, the zero-padding is reduced to five (5) characters. This referencing by the first SHA-1 octet can be used when the index value of a linked record is subject to change. Index values can change if, for example, an earlier (within the block) record is removed because of problematic content, or is a duplicate of another record.

Figure 6:
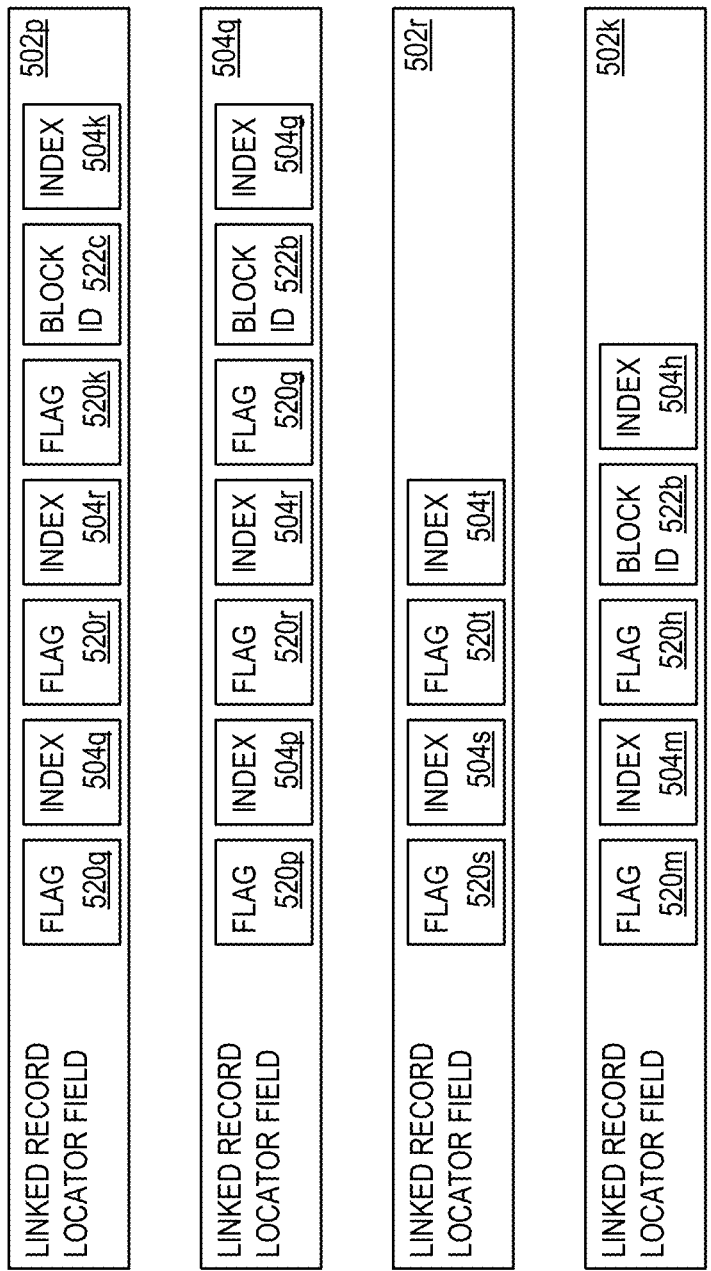
FIG. 6 illustrates linked record fields for a plurality of blockchain records.
Figure 7:
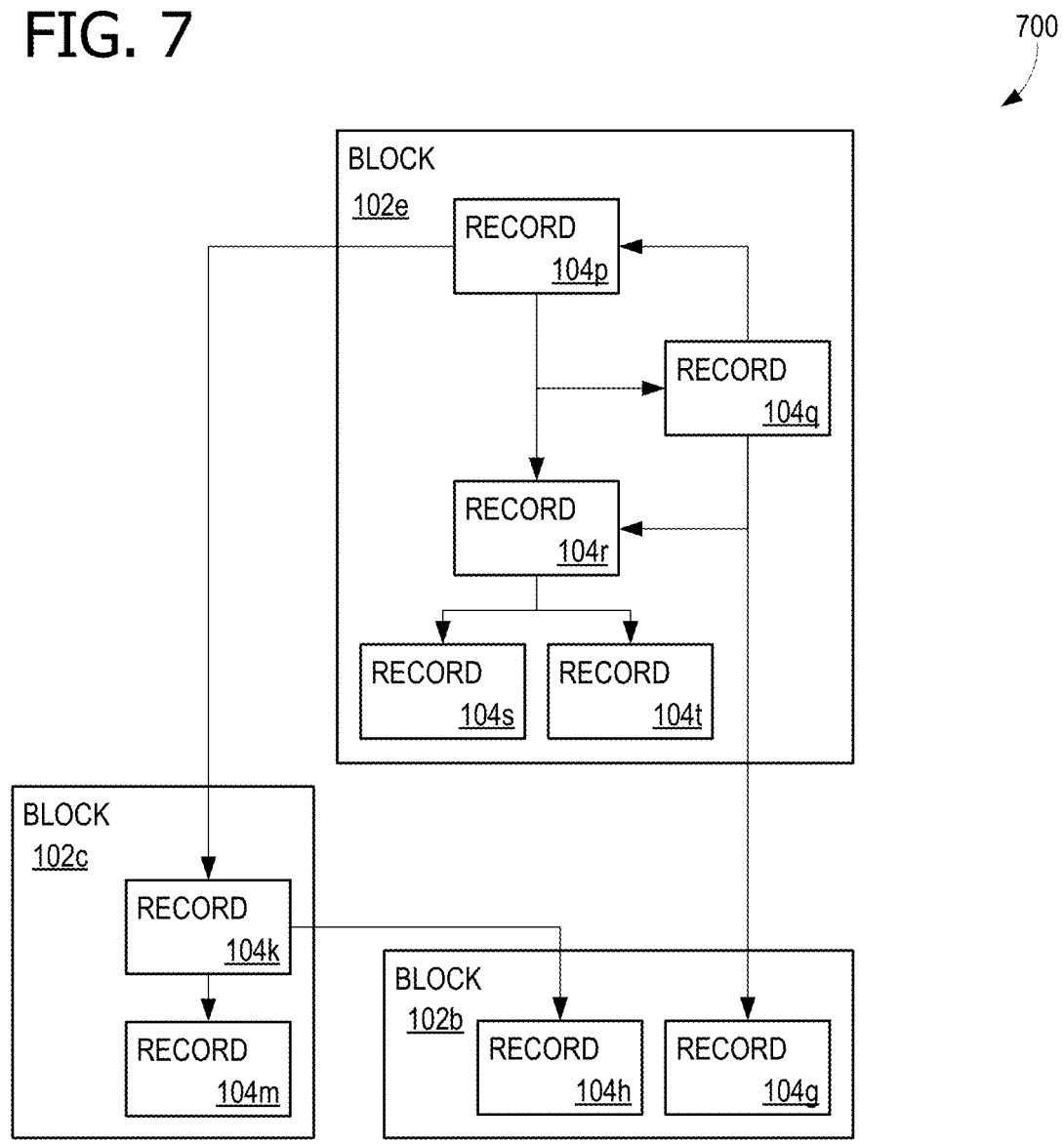
FIG. 7 illustrates a linking map of daisy chained blockchain records.

FIG. 6 illustrates linked record locator fields 502p, 502q, 502r, and 502k, for a plurality of blockchain records. Linked record locator fields 502p, 502q, 502r, and 502k will be used to generate a linking map 700 of daisy chained blockchain records, as shown in FIG. 7. Linked record locator field 502p contains links to records 104q, 104r, and 104k, as noted previously. Linked record locator field 502q has a flag 520p, an index 504p, flag 520r, index 504r, a flag 520g, a block identification 522b, and an index 504g. Flag 520p indicates that the next bit field, containing index 504p indicates an index within the same block. Index 504p is the index for record 104p. Flag 520g indicates that the next bit field, block identification 522b, indicates a different block, so the next bit field, index 504g indicates an index within the referenced block. Index 504g is the index for record 104g, and block identification 522b holds the block identification of block 102b. As can be seen in FIG. 1, record 104g is within block 102b. Linked record locator field 502r has a flag 520s, an index 504s, a flag 520t, and an index 504t. Flag 520s indicates that the next bit field, containing index 504s indicates an index within the same block. Index 504s is the index for record 104s. Flag 520t indicates that the next bit field, containing index 504t indicates an index within the same block. Index 504t is the index for record 104t. As can be seen in FIG. 4, records 104r, 104s, and 104t are all within the same block 102e. Linked record locator field 502k is the linked record field for record 104k, and has a flag 520m, an index 504m, a flag 520h, block identification 522b, and an index 504h. Flag 520m indicates that the next bit field, containing index 504m indicates an index within the same block. Index 504m is the index for record 104m. Flag 520h indicates that the next bit field, block identification 522b, indicates a different block, so the next bit field, index 504h indicates an index within the referenced block. Index 504h is the index for record 104h, and block identification 522b holds the block identification of block 102b. As can be seen in FIG. 1, record 104g is within block 102b. As can be seen in FIG. 1, records 104k and 520m are both within block 102c, and records 104h is within block 102b.

Using this information, linking map 700 can be generated. As seen in linking map 700, record 104p links to records 104q, 104r, and 104k, directly. Record 104p links back to record 104p, duplicates the link to record 104r, and directly links to record 104g. Record 104r links to records 104s and

104*t*, directly. Record 104*k* links to records 104*m* and 104*h*, directly. Thus, record 104*p* is linked through a daisy chain to record 104*h*. In total, nine (9) records are linked via a daisy chain, even though no single record links to more than three (3) records directly. The linking handles multiple records within a block, as well as spans multiple blocks. With this scheme, an unlimited number of records can be linked across an arbitrary number of blocks, with the primary limitation being that a particular record can only link to contemporaneous and preceding records.

A real-world example exists for the PEDDaL® blockchain. Block 191205a contains two records, one ending in "0000000 00002A 0000000 0000A4 100109A 000004 0000000 00001F 0000A3" and the other ending in "0000000 00001F 0000000 0000A3 100109A 00000F 0000000 00002A 0000A4". This means that the record at index 0xA3 (164 in decimal) is linked to records with index values 0x2A, 0xA4, and 0x1F within its same block 191205a, and also the record at index value 0x4 in block 100109a. Also, the record at index 0xA4 is linked to records with index values 0x1F, 0xA3, and 0x2A within its same block 191205a, and also the record at index value 0xF in block 100109a. The records at indices 0xA3 and 0xA4 are directly linked to each other. The record at index 0xA3 is not directly linked (first tier link) to the record at index value 0xF in block 100109a. However, the record at index 0xA3 is daisy chained (linked via a daisy chain) to the record at index value 0xF in block 100109a, through the record at index 0xA4. Similarly, the record at index 0xA4 is daisy chained to the record at index value 0x4 in block 100109a, through the record at index 0xA3.

Figure 8:
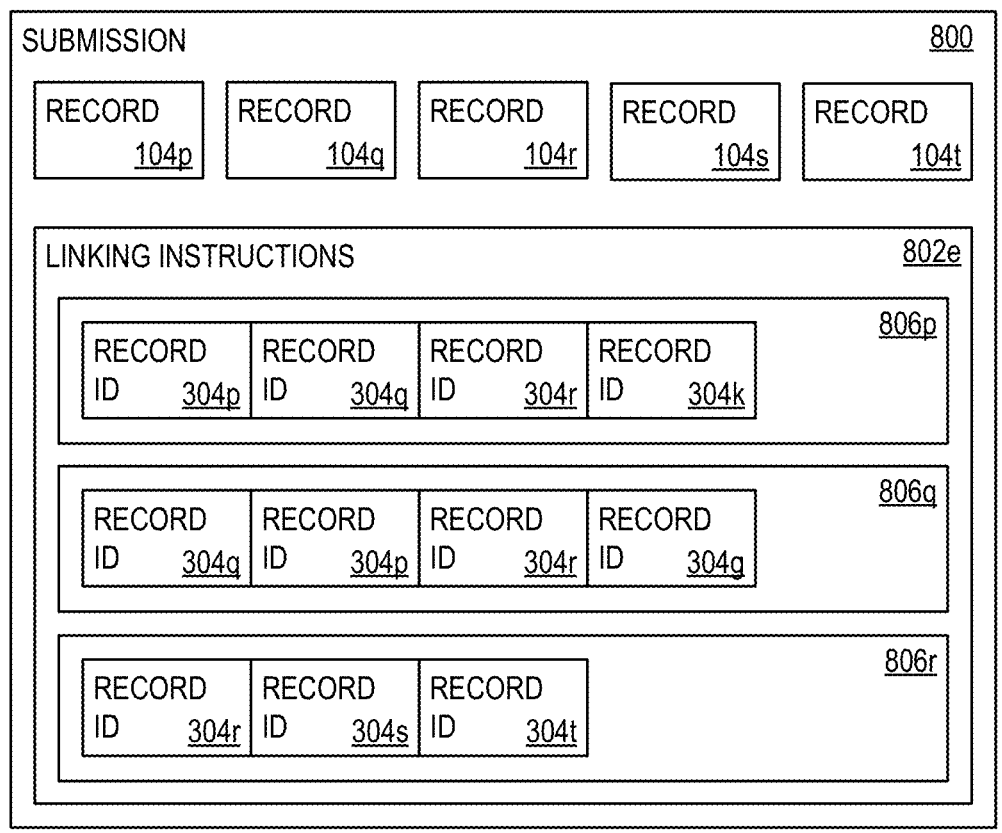
FIG. 8 illustrates a blockchain submission with linking instructions.

FIG. 8 illustrates a blockchain submission 800 with linking instructions 802*e*. Submission 800 is sent in by a submitter (a user of blockchain 100, e.g., one of submitters 131, 132, and 133). In the illustrated situation, the submitter is submitting records 104*p*-104*t*, along with linking instructions 802*e* that enable block generator 408 (see FIG. 4) to construct linked record values in linked record locator fields 502*p*, 502*q*, and 502*r* (see FIG. 6). For example, an instruction field 806*p* identifies that it is for record 104*p*, using record identifier 304*p*, and that record 104*p* should link to records 104*q*, 104*r*, and 104*k*, using record identifiers 304*q*, 304*r*, and 304*k*, respectively. An instruction field 806*q* identifies that it is for record 104*q*, using record identifier 304*q*, and that record 104*q* should link to records 104*p*, 104*r*, and 104*g*, using record identifiers 304*p*, 304*r*, and 304*g*, respectively. An instruction field 806*r* identifies that it is for record 104*r*, using a record identifier 304*r*, and that record 104*r* should link to records 104*s* and 104*t*, using record identifiers 304*s* and 304*t*, respectively. Record identifiers 304*p*-304*r*, 304*g*, and 304*k*, include sufficient information for block generator 408 to generate the flags, block identifications and indices shown in FIG. 6, and/or the linked record value that uses the contents of the linked records (e.g., the SHA-1 first octet).

Figure 9:
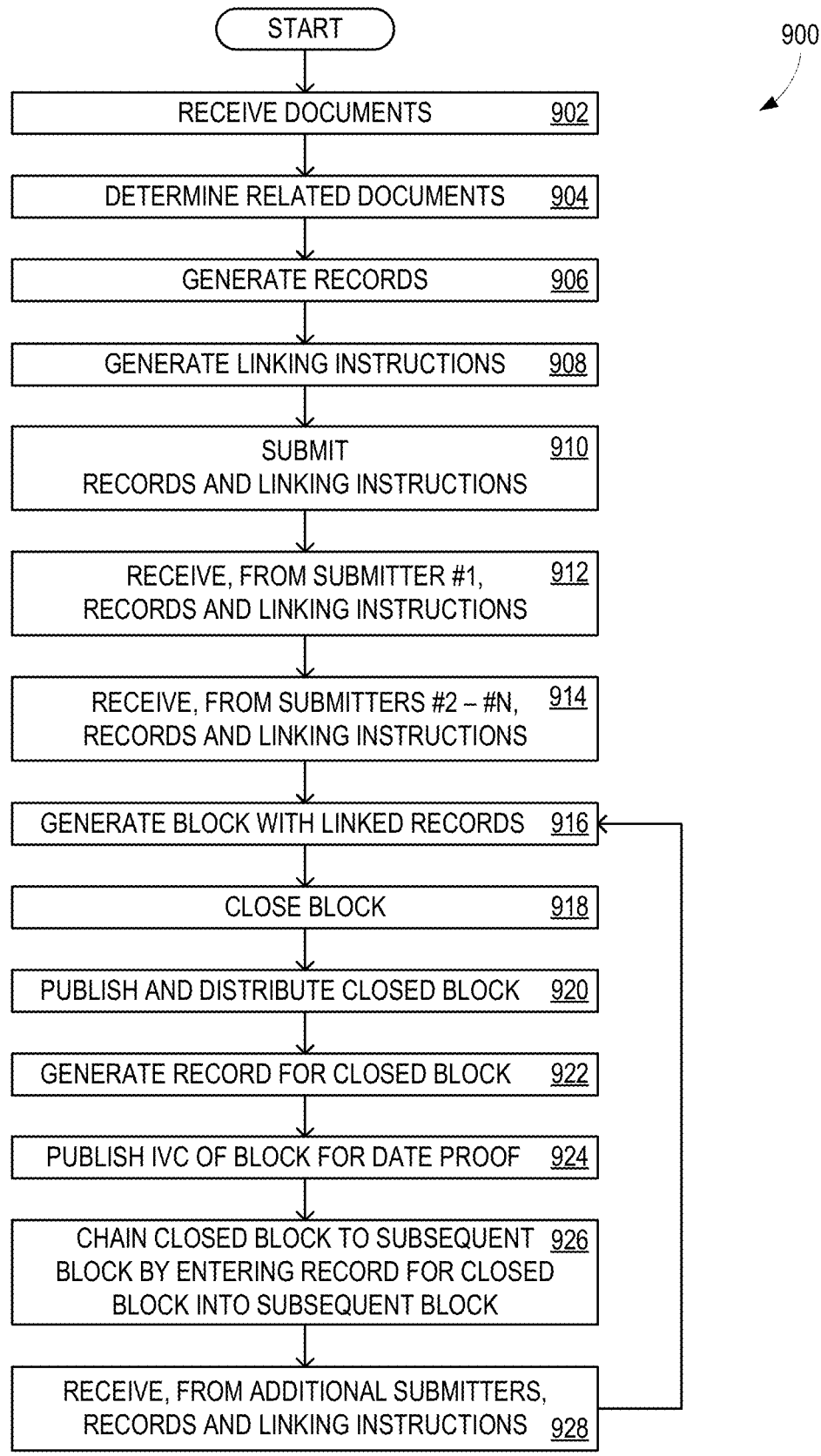
FIG. 9 illustrates a flowchart of operations associated with generating a blockchain with daisy chained record references.

FIG. 9 illustrates a flowchart 900 of operations associated with generating blockchain 100 with daisy chained record references. In some examples, at least a portion of flowchart 900 is performed using one or more computing devices 2500. Operation 902 includes receiving documents, and operation 904 includes determining related documents, which will be linked. Operation 906 includes generating document records, and operation 908 includes generating linking instructions. The record and linking instructions are submitted in operation 910 and received by a permissioning entity in operation 912. The permissioning entity receives records and linking instructions from other submitters in operation 914. A current block is generated in operation 916 and closed in operation 918. The closed block is published and distributed in operation 920 and a record is generated for it in operation 922. An IVC (e.g., hash value) for the closed block is published in operation 924, to enable later proof of the date-of-existence for the closed block. The closed block is chained to the subsequent block in operation 926, by entering the record for the closed block into the subsequent block. Additional records and linking instructions are received from yet other submitters in operation 928, and flowchart 900 returns to operation 916, thereby iterating operations 916 through 928 for an arbitrary number of chained blocks.

Figure 10:
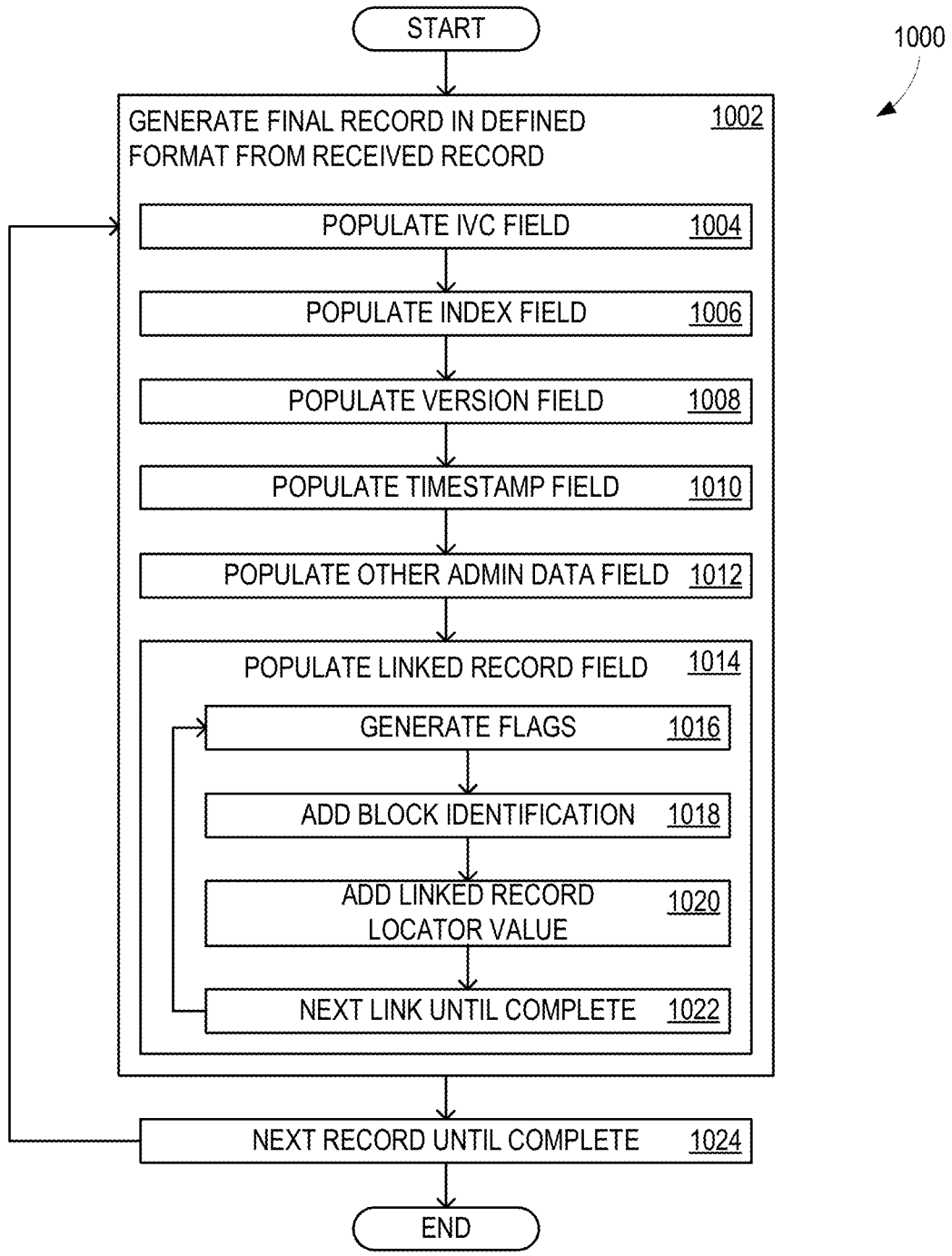
FIG. 10 illustrates another flowchart of operations associated with generating a blockchain with daisy chained record references.

FIG. 10 illustrates an expanded view of operation 916 in a flowchart. As shown, operation 916 includes operations 1002 through 1024. Operation 1002 includes generating a final record in a defined format from a received record and includes operations 1004 through 1014. Operation 1004 includes populating an IVC field with an IVC value; operation 1006 includes populating an index field with an index value; operation 1008 includes populating a generator version field with generator version information; operation 1010 includes populating a timestamp field with a timestamp value; and operation 1012 includes populating another administrative data field with the proper information.

Operation 1014 includes populating a linked record locator field and includes operations 1016 through 1020. Operation 1016 includes generating flags to specify whether a linked record is within the same block or a different block. Operation 1018 includes adding block identification for those linked records that are in a different block. Operation 1020 includes adding a linked record value, for example a record index or a portion of the content of the linked record (e.g., the first octet of the SHA-1 message digest). In some examples, adding a linked record value comprises adding a blockchain address for another record. Operation 1022 iterates operations 1016 through 1020 until all links are complete for the current record. Operation 1024 then iterates operation 1002 for all submitted records.

Figure 11:
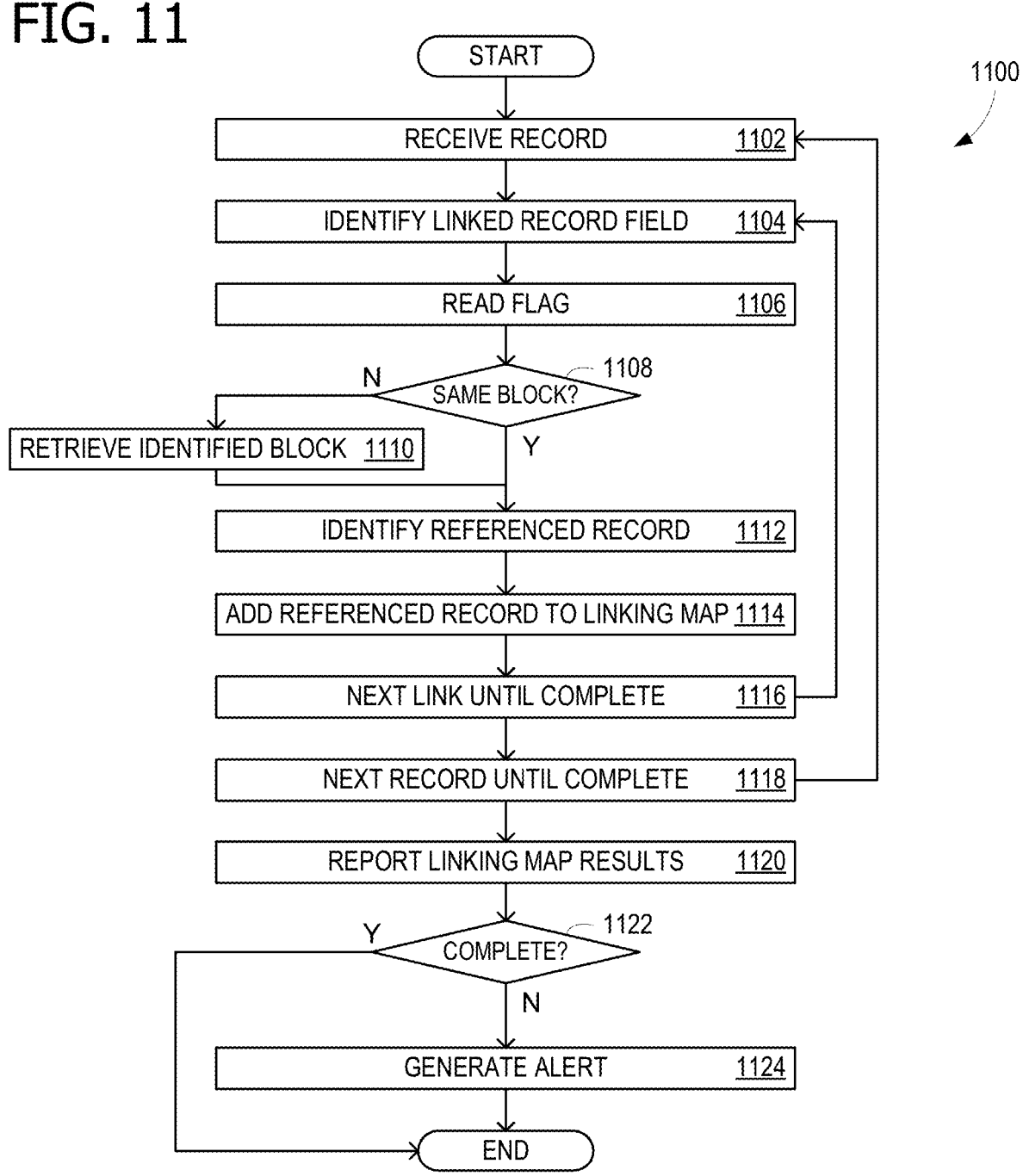
FIG. 11 illustrates a flowchart of operations associated with generating a linking map of daisy chained blockchain records.

FIG. 11 illustrates a flowchart 1100 of operations associated with generating a linking map of daisy chained blockchain records. In some examples, at least a portion of flowchart 1100 is performed using one or more computing devices 2500. Operation 1102 includes receiving a record containing links, and operation 1104 includes identifying a linked record locator field. Operation 1106 includes reading the flag (same block or different block) for the current link. If the flag indicates that the linked record is in a different block, as determined in decision operation 1108, that block is retrieved in operation 1110. The referenced record is identified in operation 1112, and the link is used to add the referenced record to the linking map in operation 1114. Operation 1116 iterates operations 1104 through 1114 for all the links in the current record. Operation 1118 iterates operations 1102 through 1116 for all referenced records, thereby exhausting the limits of the daisy chained links. Operation 1120 reports the results of the linking map, which in some examples, is a list of all related (linked) records. Decision operation 1122 determines whether a retrieved set of documents is complete, based on whether any daisy chained records do not correspond to a document in the set of documents. If any documents are missing, operation 1124 generates an alert that one or more documents, corresponding to records identified within the daisy chain, is missing.

Figure 12:
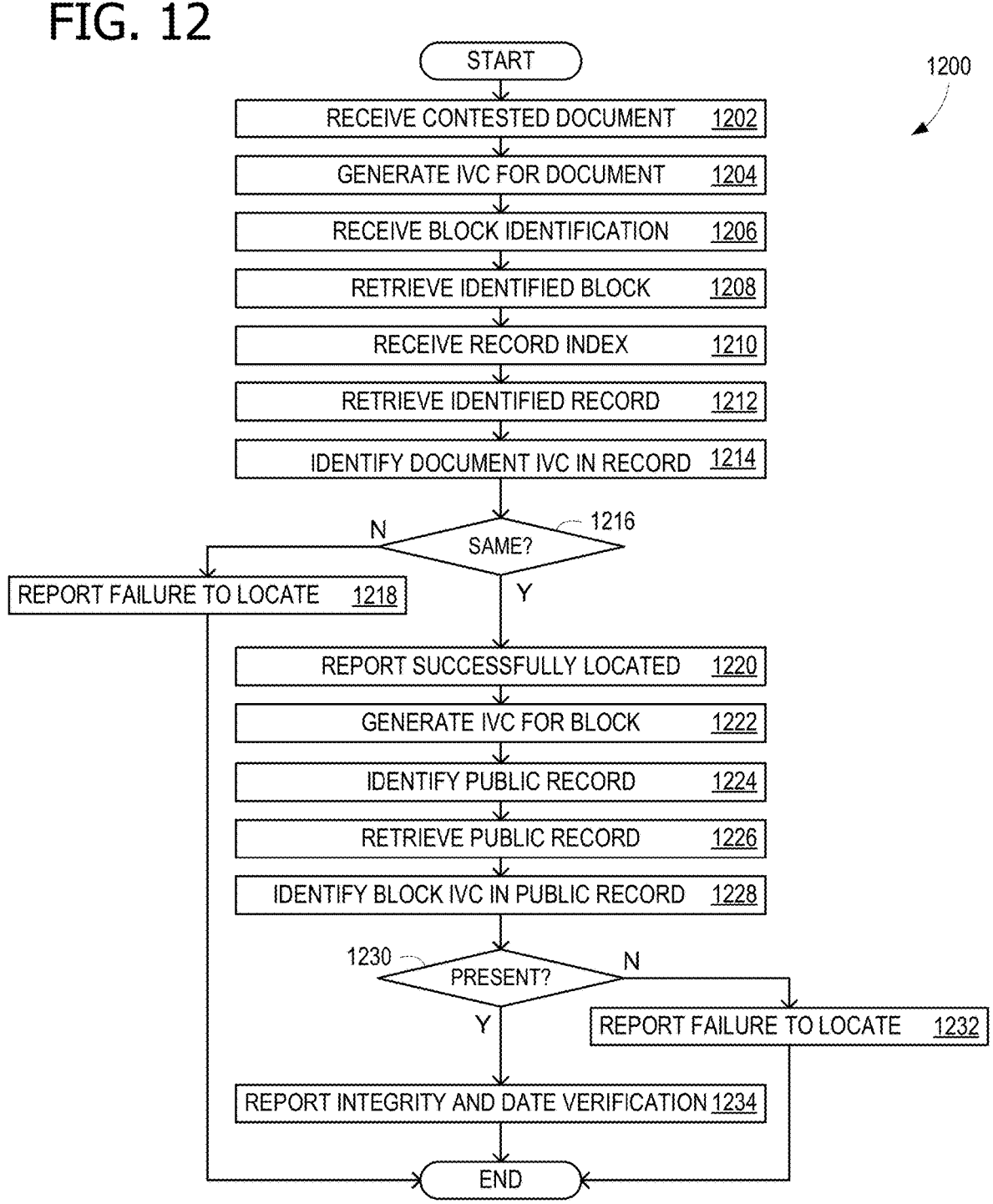
FIG. 12 illustrates a flowchart of operations associated with verifying integrity and a no-later-than date-of-existence for a document.

FIG. 12 illustrates a flowchart 1200 of operations associated with verifying integrity and a no-later-than date-of-existence for a document. In some examples, at least a portion of flowchart 1200 is performed using one or more computing devices 2500. A contested (or challenged) document is received in operation 1202, and operation 1204 includes generating an IVC (e.g., one or more hash values) for the document. Operation 1206 includes receiving block identification information, and operation 1208 includes retrieving the identified block. Operation 1210 includes receiving the record index, and operation 1212 includes retrieving the identified record from the block, using the index. Operation 1214 includes identifying the document IVC in the record, and decision operation 1216 includes comparing the IVC generated in operation 1204 with the IVC identified in operation 1214. If they are different, then operation 1218 reports a failure.

If, however, the document IVC match, then operation 1220 reports success for that first match, and operation 1222 generates an IVC for the block. The public record is identified in operation 1224 and the public record is retrieved in operation 1226. Operation 1228 includes identifying the block IVC in the public record, and decision operation 1230 includes comparing the IVC generated in operation 1222 with the IVC identified in operation 1228. If they are different, then operation 1232 reports a failure. Otherwise, operation 1234 reports that the integrity of the contested document has been verified and uses the date of the public record (Retrieved in operation 1226) as the no-later-than date-of-existence for the contested document.

Figure 13:
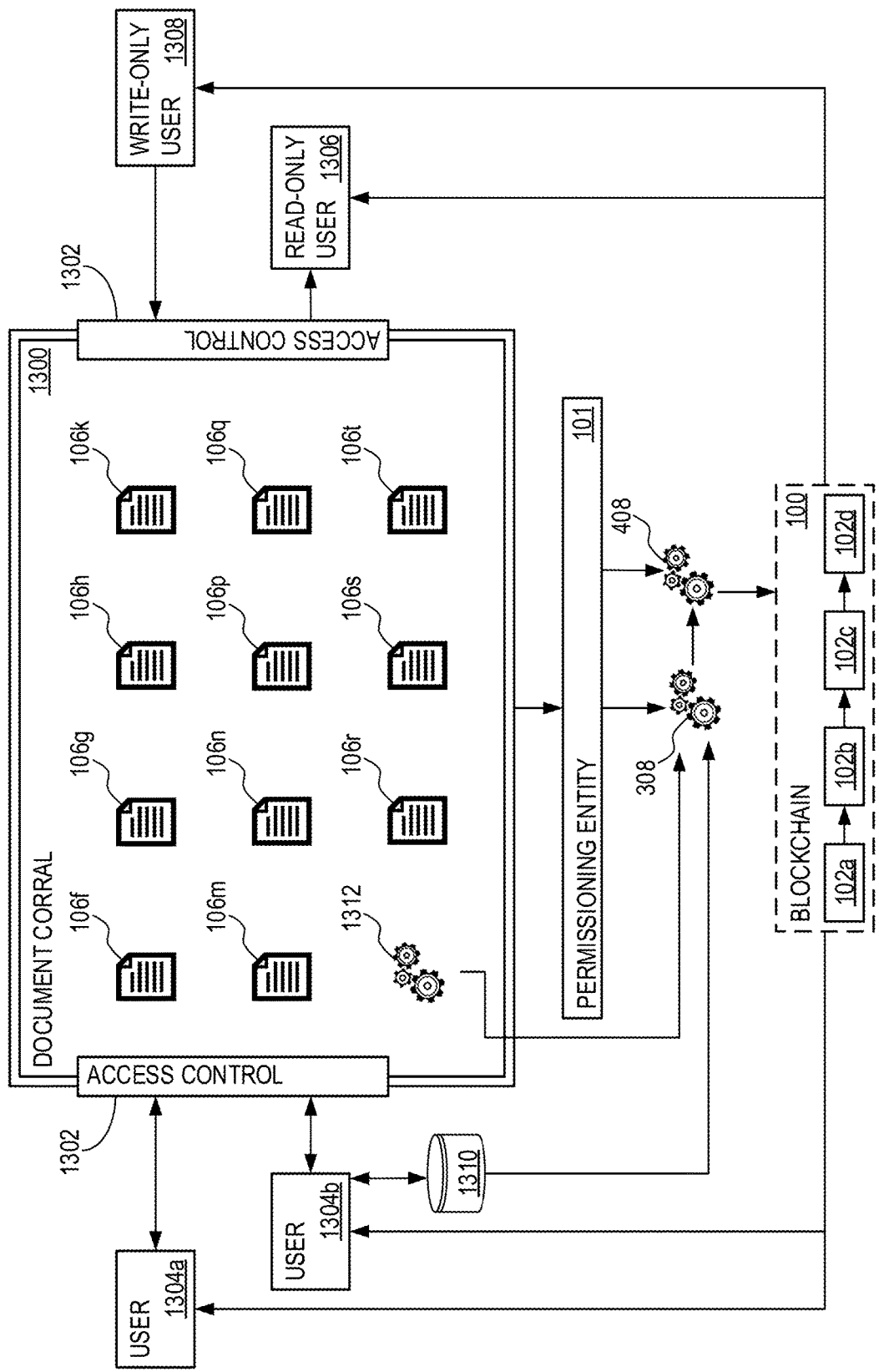
FIG. 13 illustrates a secure document corral that can be used with the blockchain of FIGS. 1A and 1B.

FIG. 13 illustrates a secure document corral 1300 that can be used with blockchain 100. Secure document corral 1300 provides access-controlled secure off-chain storage, in order to preserve document confidentiality and ease storage burdens for distributed copies of blockchain 100. A set of documents 106f-106t is held within document corral 1300. In some examples, document corral 1300 is stored in a cloud service. In some examples, document corral 1300 is stored in a physically secure facility, under the control of the operators of blockchain 100. In some examples, document corral 1300 and blockchain 100 are operated independently, by different entities. Document corral 1300 advantageously permits storage of large amounts of data, such as large numbers of documents, large documents, or both. Users can trust documents 106f-106t within document corral 1300 merely by any testing them against blockchain 100. In this way, blockchain 100 is able to establish both integrity and no-later-than date-of-existence for large volumes of data, even while blockchain 100 itself remains compact. There is thus no need to reproduce the all of documents 106f-106t on every node that has a copy of blockchain 100 or otherwise participates in the growth or use of blockchain 100. Rather, documents 106f-106t are stored in duplication only as needed for backups (e.g., recovery from failures and malicious attacks, such as ransomware) and access by users (e.g., prepositioning at geographically-dispersed nodes for quicker access). This scheme is therefore far more practical for network bandwidth limitations and user storage requirements, and is also more ecologically friendly due to less electricity demands, than in-chain storage blockchains.

An access control 1302 controls read and write privileges for documents and other data within document corral 1300. A set of users 1304a and 1304b have both read and write privileges, as permitted by access control 1302. A read-only user 1306 has only read privileges, as enforced by access control 1302. A write-only user 1308 has only write privileges, as enforced by access control 1302. In some examples, write-only user 1308 enters documents into document corral 1300 that are obtained from other sources, rather than authored by write-only user 1308. As illustrated, user 1304b has a local copy 1310 of at least some of documents 106f-106t. It should be understood, however, that any of other users 1304a, 1306, and 1308 can also have local copies of at least some of documents 106f-106t. Access control 102 restricts access to document corral 1300 to only users 1302a, 1302b, a306, 1308, and permissioning entity 101. In some examples, each of users 1302a, 1302b, a306, 1308 is restricted to accessing certain directories and/or documents (or files) within document corral 1300. That is, in some examples, access control 1302 does not grant a particular user access to the entirety of document corral 1300.

A document monitor 1312 determines when documents within document corral 1300 (e.g., any of documents 106f-106t) are new or altered and triggers generation of a blockchain record (e.g., record 104f) using record generator 308. In some examples, permissioning entity 101 uses record generator 308 to generate records upon receiving an alert from document monitor 1312. In some examples, a user (e.g., user 1304b) uses record generator 308 to generate records upon submitting (writing) documents to document corral 1300. Upon some trigger event, such as the number of document records awaiting entry into blockchain 100 reaching a threshold, or a schedule, or some other trigger event, permissioning entity 101 uses block generator 408 to generate a new block that includes at least some of the records awaiting entry into blockchain 100. Additionally, a linked record field is populated with linked record values, in accordance with linking instructions, if any are provided. In some examples, permissioning entity 101 follows at least a portion of flowchart 900 when adding a new block to blockchain 100.

Copies of blockchain 100 are then distributed among users 1302a, 1302b, 1306, and 1308, as well as possibly also stored within document corral 1300 and made available to any other interested member of the public. It is the widespread distribution of blockchain 100, placing copies of blockchain 100 out of the control of permissioning entity 101 that renders blockchain 100 readily tamper-evident. It is this tamper-evident property that provides the trust element because, with any tampering so trivially detectable, an absence of detecting tampering can be interpreted as an absence of tampering having occurred.

Users 1304a, 1304b, and 1308 can use blockchain 100 to verify that any documents newly added to document corral 1300 have a corresponding record within a recent block in blockchain 100. This can be accomplished easily, merely by hashing a local copy of the document, and searching within blockchain 100 for any record that contains the hash. In some examples, permissioning entity 101 alerts the user who submitted the document into document corral (and also other interested parties) the block ID (e.g., a sequential number code assigned to a block) and record index, so that interested parties can go straight to the identified record and verify its accuracy without having to perform a search. If any recently-submitted documents do not have a corresponding record, interested parties can alert permissioning entity 101, as well as other interested parties, about the gap, so that permissioning entity 101 is on notice of a deficiency that requires remediation.

When users 1304a, 1304b, and 1306 retrieve documents from document corral 1300, they can use blockchain 100 to verify that the documents have not changed since the time of the earliest corresponding record within blockchain 100. Any documents for which no corresponding record exists within blockchain 100 (e.g., no record contains the hash value (message digest) of the document) are treated as unverified. Additionally, in the event that any of users 1304*a*, 1304*b*, and 1306 retrieves a set of documents from document corral 1300, the set of documents can be checked for completeness by using linked record locator fields. (See FIGS. 5, 6, and 7.) This can be accomplished by hashing each document within the set and identifying corresponding records for that set of documents. If any records identified within the daisy chain arrangement are missing from the set of corresponding records, the user can then easily identify that a gap exists. Thus, this arrangement provides an additional dimension of trust: Not only are the documents themselves trustworthy (if they pass validation using the records), but the completeness of a given set of documents can also be trusted (if all daisy chained references are accounted for within the set).

Figure 14:
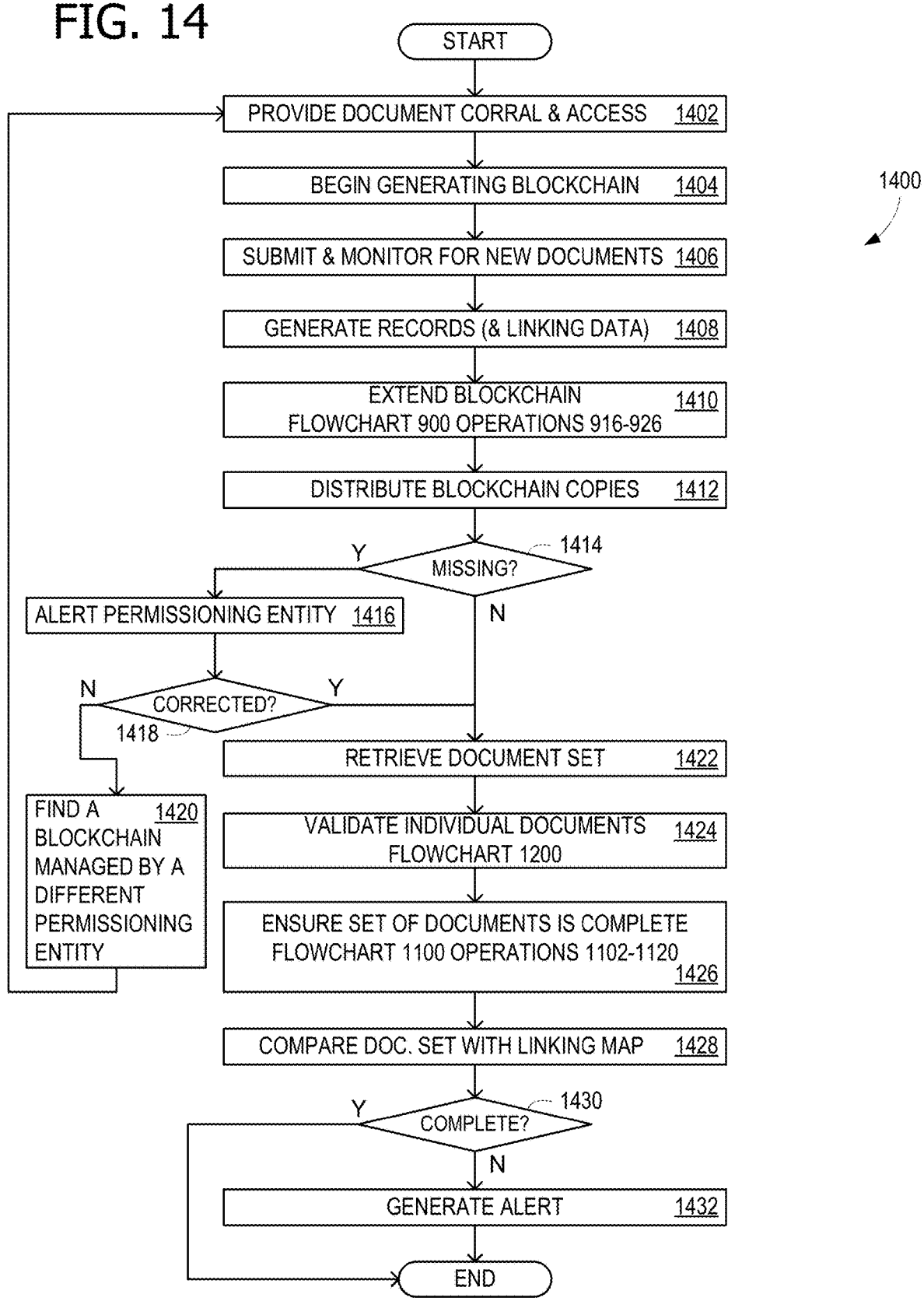
FIG. 14 illustrates a flowchart of operations associated with using a blockchain with a document corral.

FIG. 14 illustrates a flowchart 1400 of operations associated with using blockchain 100 with document corral 1300. In some examples, at least a portion of flowchart 1400 is performed using one or more computing devices 2500. Operation 1402 includes providing a document corral (e.g., document corral 1300), and granting external entities access to the document corral, based at least on permissions set for the external entities. The associated blockchain (e.g., blockchain 100) is generated in operation 1404. Users submit new documents and edit (alter) documents within the document corral in operation 1406. Additionally, a document monitoring component monitors for additions and alterations. In some examples, users of the document corral are notified when their submitted documents are received.

New records are generated for new and altered documents in operation 1408. That is, operation 1408 includes based at least upon detecting an addition or alteration of a document within the document corral, generating a blockchain record for the document. In some examples, linking data for sets of documents is also generated. In such examples, operation 1408 includes generating a blockchain record with a linked record value. In some examples, the linked record value indicates a prior version of an altered document. In some examples, the linked record value indicates a second document that is related to a received document. In such examples, the document relationships would need to be identified, such as specified by a user, electronically extracted from a data structure, or perhaps determining that both documents were attachments to a common message or appeared in a common source location. In some examples, users of the document corral are notified when records corresponding to their submitted documents are generated, and at least a portion of the records (e.g., IVCs) are provided to the users.

Operation 1410 includes extending the blockchain by adding the blockchain record into a new block of the blockchain and adding one or more new blocks to the blockchain. In some examples, operation 1410 includes the activities described previously for operations 916-926 of flowchart 900. A trigger event can be used for operation 1410, such as a threshold number of new records awaiting entry into the blockchain, or a schedule, or some other event. In some examples, users of the document corral are notified when records corresponding to their submitted documents are placed into the blockchain, and blockchain addresses for the records are provided to the users. Operation 1412 includes distribute copies of the blockchain outside the control of the permissioning entity (e.g., permissioning entity 101 of FIG. 1B), so that the permissioning entity is unable to alter the blockchain without detection. In some examples, distributing copies of the blockchain outside the control of a permissioning entity of the blockchain comprises publishing the blockchain on a website. In decision operation 1414, users and other external interested parties verify that newly submitted or altered documents have corresponding records. If any are missing, an alert is generated for the permissioning entity and others (to ensure that the permissioning entity's activities are properly scrutinized), in operation 1416. At this point, the permissioning entity should correct the omission, which is checked in decision operation 1418. If the permissioning entity fails to correct the omission, affected users should find a blockchain managed by a different permissioning entity, as operation 1420, and start again at operation 1402 with the new blockchain, document corral, and permissioning entity.

Users retrieve documents from the document corral, either individually or in sets, in operation 1422. Operation 1424 includes validating individual documents according to flowchart 1200, or some other similar process. In operation 1426, users ensure that the set of documents retrieved is complete. Users can traverse the linked record locator fields (if applicable) to rebuild a daisy chain of document relationships, as described for operations 1102-1120 of flowchart 1100. The set of documents is compared with the reported linking map results, in operation 1428. The completeness of the set is determined in decision operation 1430, and if any documents are missing, an alert is generated in operation 1432. The alert may be sent to permissioning entity, the specific user, and even others, in an attempt to ensure that the operations of document corral 1300 are subjected to proper scrutiny.

Figure 15:
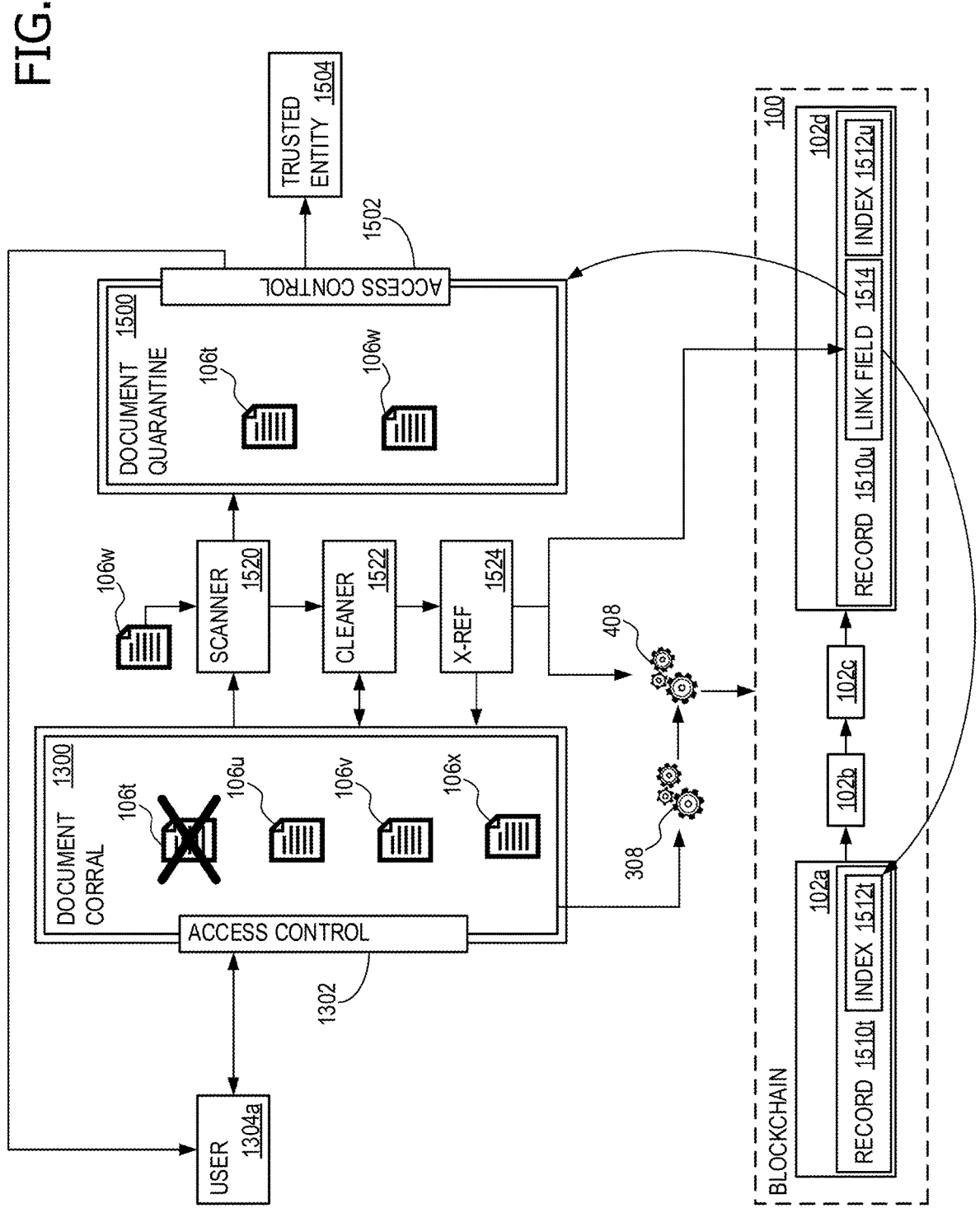
FIG. 15 illustrates a secure document corral with a quarantine capability that enhances the secure document corral of FIG. 13.

FIG. 15 illustrates a secure document corral 1300 with a quarantine 1500 that enhances security over the arrangement shown in FIG. 13. For clarity, not all elements of FIG. 13 are reproduced in FIG. 15, although it should be understood that any components or capability described for FIGS. 1-14 may also be available for the arrangement shown in FIG. 15. User 1304*a* (or another user) has placed document 106*t* into document corral 1300, and a record 1510*t* for document 106*t* is within blockchain 100, specifically, within block 102*a* at index 1512*t*. The block ID of block 102*a* and the value of index 1512*t* form an address of record 1510 within blockchain 100.

A trigger event has identified document 106*t* as problematic. For example, document 106*t* may have material that comprises privacy violations, intellectual property rights violations, malicious logic, and/or obscenity. Triggers may include periodic scans, the addition of new documents into document corral, or events such as user 1304*a* or another entity (e.g. permissioning entity 101) is provided a notice from a law enforcement authority, a court, an attorney, or source indicating that distribution of document 106*t* will create a legal liability. Alternatively, a scanner 1520 monitors documents (e.g., document 106*t*) within document corral 1300 for quarantine triggers, for example, by scanning the documents for problematic material. In some examples, quarantine triggers are selected from the list consisting of: privacy violations, intellectual property rights violations, malicious logic, and obscenity.

Scanner 1520 identifies that document 106*t* is to be quarantined on its own, or by user 1304*a* flagging document 106*t* to scanner 1520. Based at least upon determining that document 106*t* is to be quarantined, scanner 1520, or another suitable component, moves document 106*t* into document quarantine 1500, which provides quarantine storage capability. That is, scanner 1520 (or some other suitable component) removes document 106*t* from document corral 1300 and places a copy within document quarantine 1500. Scanner 1520 then also forwards a copy of document 106*t* to a cleaner 1522 to generate document 106*u* as a replacement for document 106*t* in document corral 1300. In some examples, cleaner 1522 generates document 106*u* from document 106*t* by removing material that triggered quarantine. In some examples, cleaner 1522 generates document 106*u* as a summary of document 106*t*.

Document 106*u* is thus a cleaned version of document 106*t*, which represents document 106*t*, and is placed into document corral 1300. Document 106*u* should therefore not trigger quarantine. Records 1510*u* is generated for document 106*u* using record generator 308 and block generator 408, and added into blockchain 100 (in block 102*d* at index 1512*u*). Record 1510*u* has linking information in a linked record field 1514. In some examples, linked record field 1514 is the same format as linked record locator field 502*p* of FIG. 5. This provides a no-later-than date-of-existence for document 106*u*, which is a provable date for a clean version of document 106*t*. Cleaner 1522 provides the relationship information for documents 106*t* and 106*u* to a cross-reference component 1524, which generates linking instructions (e.g., linking instructions 802*e*) to place into linked record field 1514. As indicated, linked record field 1514 indicates the blockchain address of record 1510*t*. In some examples, linked record field 1514 also includes identification of document 106*t* and/or a quarantine location (e.g., document quarantine 1500) of document 106*t*. This quarantine process may be recursive. For example, if quarantine conditions change to include material within document 106*u*, document 106*u* may be moved into document quarantine 1500 and this process repeated using a new cleaned version of document 106*u*.

In some examples, a cleaned reference document 106*v* permits rapid cross referencing of documents 106*t* and 106*u*. For example, cleaned reference document 106*v* may include document identifiers (e.g., document names) for both documents 106*t* and 106*u*, along with an annotation that document 106*t* is the original document, which is now stored in document quarantine 1500, and document 106*u* is the replacement in document corral 1300. In some examples, cleaner 1522 generated cleaned reference document 106*v*. In some examples, cleaned reference document 106*v* includes at least one item selected from the list consisting of: identification of document 106*t*, identification of a quarantine location (e.g., document quarantine 1500) of document 106*t*, a blockchain address of record 1510*t*, identification of document 106*u*, and a blockchain address of record 1510*u*. In some examples, cleaned reference document 106*v* is created or updated after record 1510*u* is placed into blockchain 100, so that the address of record 1510*u* is known. In some examples, one cleaned reference document is generated for each pair of quarantined and cleaned documents. In some examples, a cleaned reference document contains identification of multiple pairs of quarantined and cleaned documents, and is appended with new pairs, as more documents go into document quarantine 1500.

With document 106*t* having been removed from document corral 1300, proving the integrity and no-later-than date-of-existence for document 106*t* requires additional work. In one example, for example if document 106*t* had contained malware rather than illegal material, user 1304*a* may be willing to retrieve a copy of document 106*t* from document quarantine 1500 via access control 1502. This may be the case, for example, if since the time that document 106*t* had been placed into document quarantine 1500, the anti-virus (or other malware protection on the computer of user 1304*a*) had improved sufficiently that document 106*t* no longer presents a significant threat. For security, though access control 502 for document quarantine 1500 may be more stringent, such as with fewer authorized users and/or a stricter authentication scheme, than access control 1302 for document corral 1300.

In some scenarios, user 1304*a* cannot or prefers to not access document 106*t* in document quarantine 1500. A trusted entity 1504, however has access to document quarantine 1500 and can retrieve it for verifying that it matches record 1510*t*. That is, trusted entity 1504 establishes a no-later-than date of existence for document 106*t* using blockchain 100 by generating an IVC for document 106*t*; comparing the generated IVC for document 106*t* with a recorded IVC within record 1510*t* within blockchain 100; and reporting a no-later-than date of existence for an earliest block (e.g., block 102*a*) that contains the recorded IVC. In such scenarios, however, it may be required that a document challenger or arbiter accept the reporting of trusted entity 1504. Although this may be an imperfection in the concept of a blockchain providing self-evident proof, in this manner, even documents containing problematic material can have a version of a provable no-later-than date-of-existence.

In some examples, documents are submitted to scanner 1520 prior to being placed into document corral 1300. In the illustrated scenario, document 106*w* is submitted to scanner 1520 and goes straight into document quarantine 1500 without first being placed into document corral 1300. In this scenario, a cleaned document 106*x*, representing document 106*w* but without the problematic material, is placed into document corral 1300.

Figure 16:
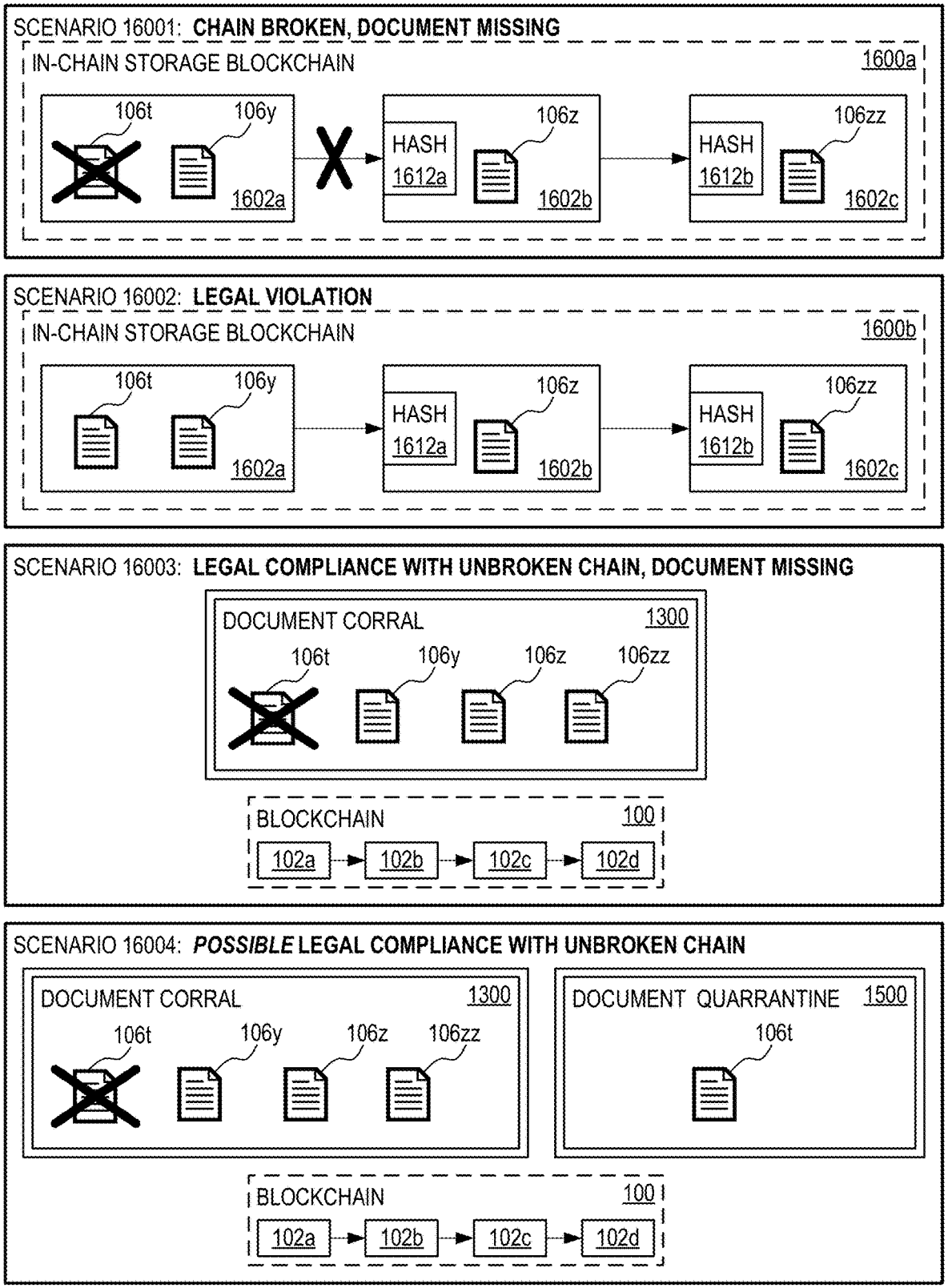
FIG. 16 illustrates scenarios of blockchains being in compliance or non-compliance of legal requirements.

FIG. 16 illustrates scenarios of blockchains being in compliance or non-compliance of legal requirements. Four scenarios are presented. In scenario 16001, an in-chain storage blockchain 1600*a* holds a copy of document 106*t* in block 1602*a*. That hash value (hash function message digest) of block 1602*a* is calculated by hashing the combination of at least documents 106*t* and 106*y*. This value is stored as hash value 1612*a* in block 1602*b*. The hash value of block 1602*b* is calculated by hashing the combination of at least hash value 1612*a* and document 106*z*. This value is stored as hash value 1612*b* in block 1602*c*, which is shown as holding document 106*zz*.

However, document 106*t* is subject to a court order or law enforcement requirement to destroy all copies. For example, document 106*t* may be a privacy violation or obscene material. Document 106*t* is removed from all copies of blockchain 1600*a*. The result is that hashing block 1602*a* now produces a hash value that no longer matches hash value 1612*a*. This breaks the chain because block 1602*a* can no longer be proven to have existed prior to the calculation of hash value 1612*b*. Unfortunately, document 106*t* is not the only document negatively affected. Without being able to prove the location of the modified version of block 1602*a* (the version missing document 106*t*) within blockchain 1600*a*, the value of having placed document 106*y* within blockchain 1600*a* is also damaged. The removal of documents from an in-chain storage blockchain threatens to destroy the protection for all documents within the same and earlier blocks.

In scenario 16002, an in-chain storage blockchain 1600*b* is similarly configured and holds a copy of document 106*t* in block 1602*a*. However, knowing the effect that removing document 106*t* had on blockchain 1600*a*, the community that maintains blockchain 1600*b* does not remove document 106*t*, despite the court order or law enforcement requirement. Anyone possessing a copy of blockchain 1600*b* (at least the portion that includes block 1602*a*) is committing a legal violation. The prospects indicated in scenarios 16001 and 16002 can thus threaten the long term viability of in-chain storage blockchains.

In contrast, for scenario 16003, when document 106*t* is removed from document corral 1300, blockchain 100 is unaffected and therefore unbroken. The record for document 106*t* cannot be used to recreate the problematic content, and so does not require removal. Although the protection of document 106*t* that had been provided by blockchain 100 is now gone, blockchain 100 is in legal compliance, and the no-later-than dates of existence for documents 106*y*, 106*z* and 106*zz* can still be proven. Scenario 16004 involves moving document 106*t* into document quarantine 1500, rather than merely deleting it. If document quarantine 1500 is handled properly, such as by storing documents outside the jurisdiction of the relevant court or law enforcement agency, or perhaps by operating document quarantine 1500 in a manner that is blessed by the relevant court or law enforcement agency, the proof for document 106*t* may yet persist, even with legal compliance.

Figure 17:
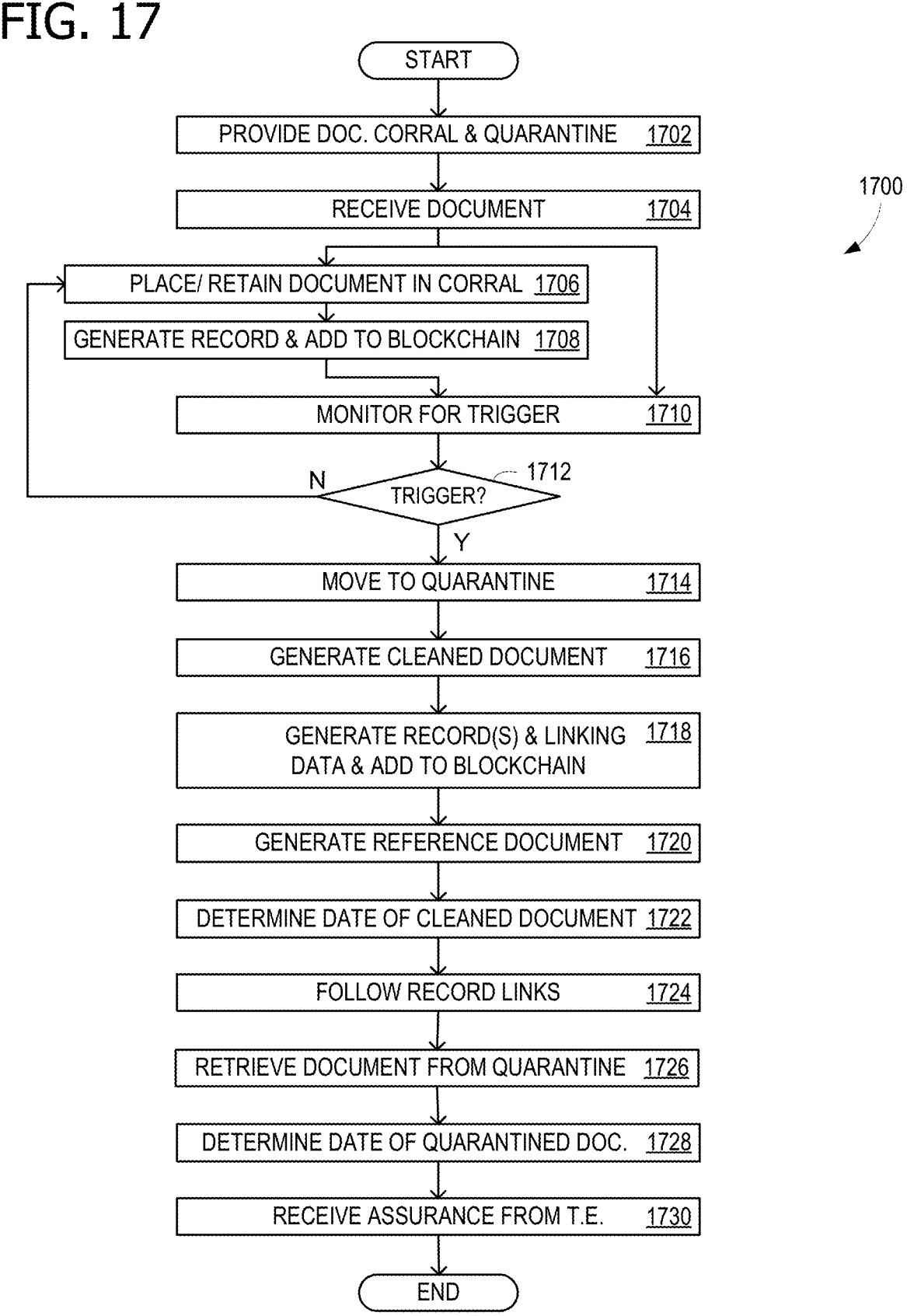
FIG. 17 illustrates a flowchart of operations associated with using a blockchain with a quarantine-capable document corral.

FIG. 17 illustrates a flowchart 1700 of operations associated with using blockchain 100 with a quarantine-capable version of document corral 1300 (e.g., with document quarantine 1500), as shown in FIG. 15. In some examples, at least a portion of flowchart 1700 is performed using one or more computing devices 2500. Operation 1702 includes providing a document corral, a document quarantine, and access to users. In some examples providing access to the document quarantine includes providing access to a trusted entity. A first document is received at 1704. In some examples, the received first document is placed into the document corral, in operation 1706. Operation 1708 then includes generating a first blockchain record for the first document and adding the first blockchain record into the blockchain. Operation 1710 includes monitoring documents within the document corral for quarantine triggers. In some examples, quarantine triggers are selected from the list consisting of: privacy violations, intellectual property rights violations, malicious logic, and obscenity.

In some examples, however, the received first document is not placed into the document corral until after it has been checked for quarantine triggers. In such examples, operation 1710 follows operation 1704. Decision operation 1712 determines whether the first document is to be quarantined. If not, flowchart 1700 returns to operation 1706, in which the first document is placed into the document corral or permitted to remain there. Even though a trigger condition has not yet been identified, it is possible that a trigger condition may arise in the future.

If decision operation 1712 identifies that the first document is to be quarantined, operation 1714 includes, based at least upon determining that the first document is to be quarantined, moving the first document into the document quarantine. In some examples, this includes removing the first document from the document corral. A cleaned document is generated in operation 1716. For example, operation 1716 includes generating a second document as a replacement for the first document in the document corral, the second document not triggering quarantine. In some examples, generating the second document from the first document includes removing material that triggered quarantine. In some examples, the second document is a summary of the first document.

Operation 1718 includes generating a second blockchain record for the second document and adding the second blockchain record into the blockchain. In some examples, generating a second blockchain record for the second document includes generating a blockchain record with a linked record value. In some examples, the linked record value indicates a blockchain address of the first record. In some examples, the linked record value indicates the first document. In some examples, the linked record value indicates quarantine storage. Operation 1720 includes generating a cleaned reference document. In some examples, the cleaned reference document includes at least one item selected from the list consisting of: identification of the first document, identification of a quarantine location of the first document, a blockchain address of the first record, identification of the second document, and a blockchain address of the second record.

At this point, the conditions are set for later proving integrity and no-later-than dates of existence for at least the first (quarantined) and second (cleaned) documents. The cleaned reference document may also be set up for date proof, although its value is less than establishing its age than in permitting rapid identification and/or location of one of the first and second documents from the other. The date proof is similar as has been described earlier for proving ages and integrity for documents and traversing a daisy chain. Operation 1722 includes retrieving the second document from the document corral and determining integrity or a no-later-than date of existence for the second document using the blockchain. The date proof of the second document may, however, be less important than the date proof of the first document, and so may be skipped in some examples.

Operation 1724 includes identifying, within a linked record locator field of the second blockchain record, a linked record value for the first document. In some examples, this is the first blockchain record, whereas in some examples, it is another locator or document identifier. Once the first document is located, operation 1726 includes retrieving the first document from the document quarantine. Operation 1728 includes locating the first blockchain record within the blockchain and determining a no-later-than date of existence for the first document using the blockchain and the first blockchain record. In some examples, a normal user retrieves the first document from the document quarantine and determines the date, hopefully without encountering problems related to the reason for the quarantine. In some examples, however, the trusted entity performs operations 1724-1728. In such examples, the assurance from the trusted entity is the key to establishing the date for the first document. This is because anyone can independently identify (with certainty) a no-later-than date for the first blockchain record. However, only the trusted entity can hash the first document, if the document quarantine access is so limited. Therefore, operation 1730 includes receiving, from the trusted entity, assurance that the first blockchain record matches the first document. This assurance completes the proof for date and integrity.

Figure 18:
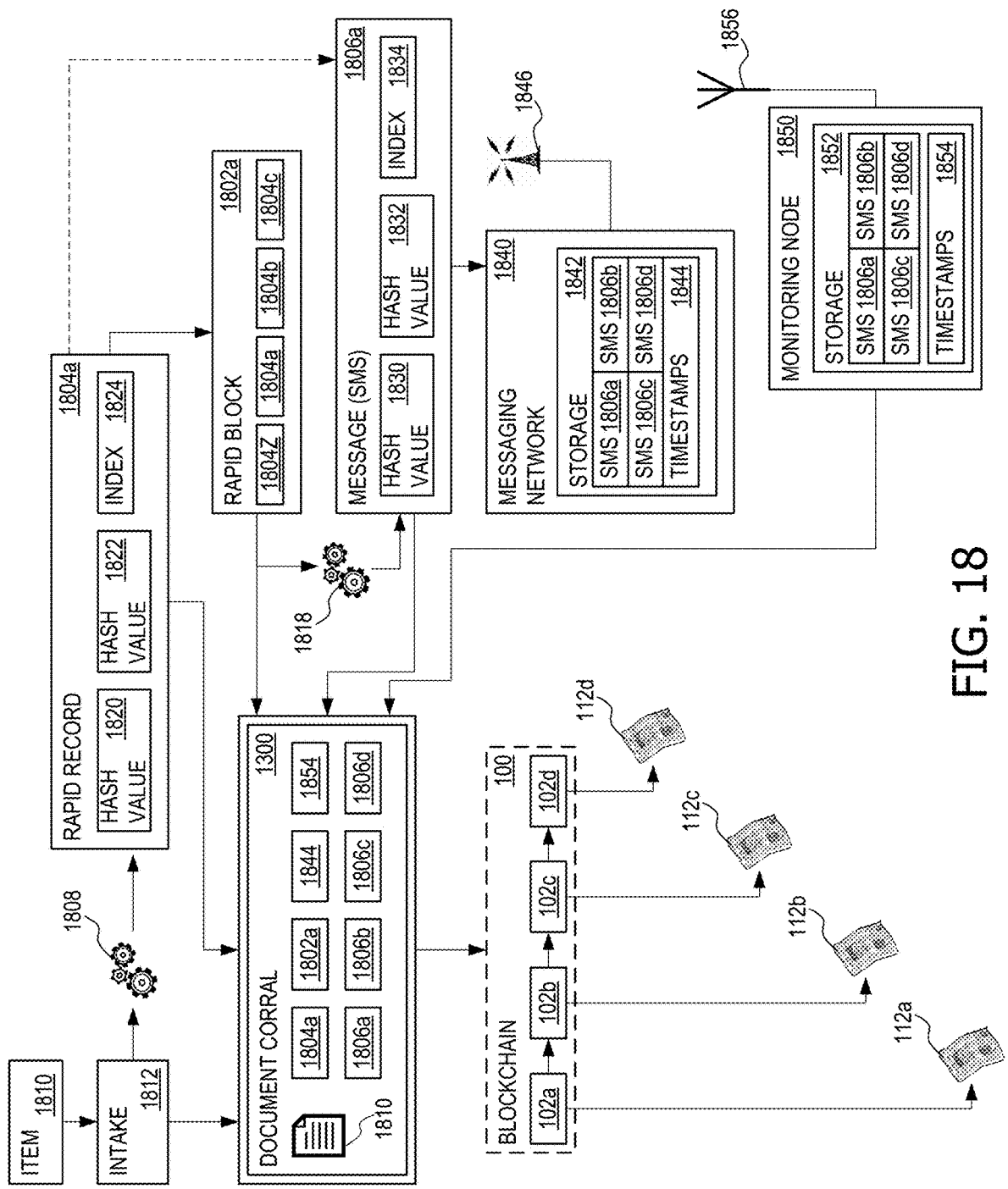
FIG. 18 illustrates the use of a network message for timestamping a block.

FIG. 18 illustrates the use of a network message for timestamping a block. A digital item 1810, for example an electronic document such as an image, a video or audio recording, a word processing document, a spreadsheet, a presentation, a token or cryptocurrency transaction, a token or cryptocurrency ledger, or any other digital file, is to be registered in blockchain 100. Item 1810 is sent to an intake 1812 (e.g., a node operated by permissioning entity or some other node or device), that uses a record generator 1808 to generate a rapid record 1804*a* for item 1810. As illustrated, rapid record 1804*a* includes a first hash value 1820 for item 1810, a second hash value 1822 for item 1810, and an index 1824, such as the count of rapid records having been generated since some reference time or event (e.g., on a particular date). Intake 1812 also submits item 1810 to document corral 1300. A record for item 1810, and other items within document corral 1300, will appear within blockchain 100 as described in relation to FIG. 13.

In some examples, hash values 1820 and 1822 include one or more portions of the SHA-1, SHA-224, SHA-256, SHA-384, and the SHA-512 message digests. The use of two different hash values significantly increases resistance to second preimage attacks. Together hash values 1820 and 1822 form an IVC for item 1810. In some examples, rapid record 1804a will appear as a short message service (SMS) message. A single SMS message has a character limit of around 160 characters, unless multiple messages are strung together. A single SMS is able to hold SHA-1 and SHA-384, and still have 24 characters remaining for index 1824 and other data. A 4-character hexadecimal index field can indicate up to 65,535, which is sufficient to issue a new record index number every minute for an entire week, prior to resetting. A 3-character index field is sufficient to issue a new record index number every minute for an entire day, and leaves more than 20 characters for other administrative data or codes, such as versioning numbers. In some examples, rapid record 1804a is also submitted to document corral 1300.

Rapid record 1804a is entered into a rapid block 1802a, which may also be submitted to document corral 1300. As illustrated, rapid block 1802a holds rapid record 1804a, subsequent rapid records 1804b and 1804c, and a rapid record 1804Z for a prior rapid block, thereby chaining rapid block 1802a and the prior rapid block. A network message generator 1818 generates a network message 1806a, and includes an IVC generator to generate hash value 1830 and hash value 1832 for inclusion within network message 1806a. In some examples, network message 1806a comprises an SMS message. In some examples, network message 1806a comprises a social media post, such as on Twitter or another social media network. Some examples use network messages that are derived from rapid blocks (as just described), some examples use network messages that are copies or near copies of rapid records, and some examples use both. In either case, network message 1806a indicates rapid record 1804a. Network message 1806a also includes an index 1834.

Network message 1806a is submitted to a public messaging network 1840 for broadcasting. Network message 1806a may also be submitted to document corral 1300, whether by messaging network 1840 or another entity that generated network message 1806a for submission to messaging network 1840. Messaging network 1840 timestamps network message 1806a and broadcasts network message 1806a over public network 1846, which may be a wireless or wired network. For example, public network 1846 may be a cellular network, a widely-distributed e-mail, or a website on the internet. As illustrated, messaging network 1840 stores network message 1806a and other network messages 1806b-1806d in its storage 1842, for at least a while. Timestamps 1844 holds timestamping information for network messages 1806a-1806d.

A monitoring node 1850, for example a third party that is unrelated to item 1810, has no knowledge of the contents of item 1810, and thus has no interest in falsifying data with regards to item 1810 monitors public network 1846 with a monitoring component 1856. Monitoring component 1856 is able to receive broadcasts from public network 1846. As illustrated, monitoring node 1850 stores received network message 1806a and other received network messages 1806b-1806d that had been broadcast by messaging network 1840, in its storage 1852. In some examples, monitoring node 1850 timestamps network messages 1806a-1806d as they are received, and stores them in timestamps 1854. Timestamps 1854 may provide an independent time verification source for network messages 1806a-1806d, that are outside the control of messaging network 1840. As shown, any of network messages 1806a-1806d, timestamps 1844, and timestamps 1854 may be submitted to document corral for inclusion in blockchain 100.

Although messaging network 1840 may eventually delete network messages 1806a-1806d and timestamps 1844, and monitoring node 1850 may cease operations, thereby losing network messages 1806a-1806d timestamps 1854, public records 112a-112d provide permanent, truly independent date proof for copies of network messages 1806a-1806d within document corral 1300. Although public records 112a-112d do not have the fine time resolution of timestamps 1844 and 1854, they are independently verifiable and permanent.

Figure 19:
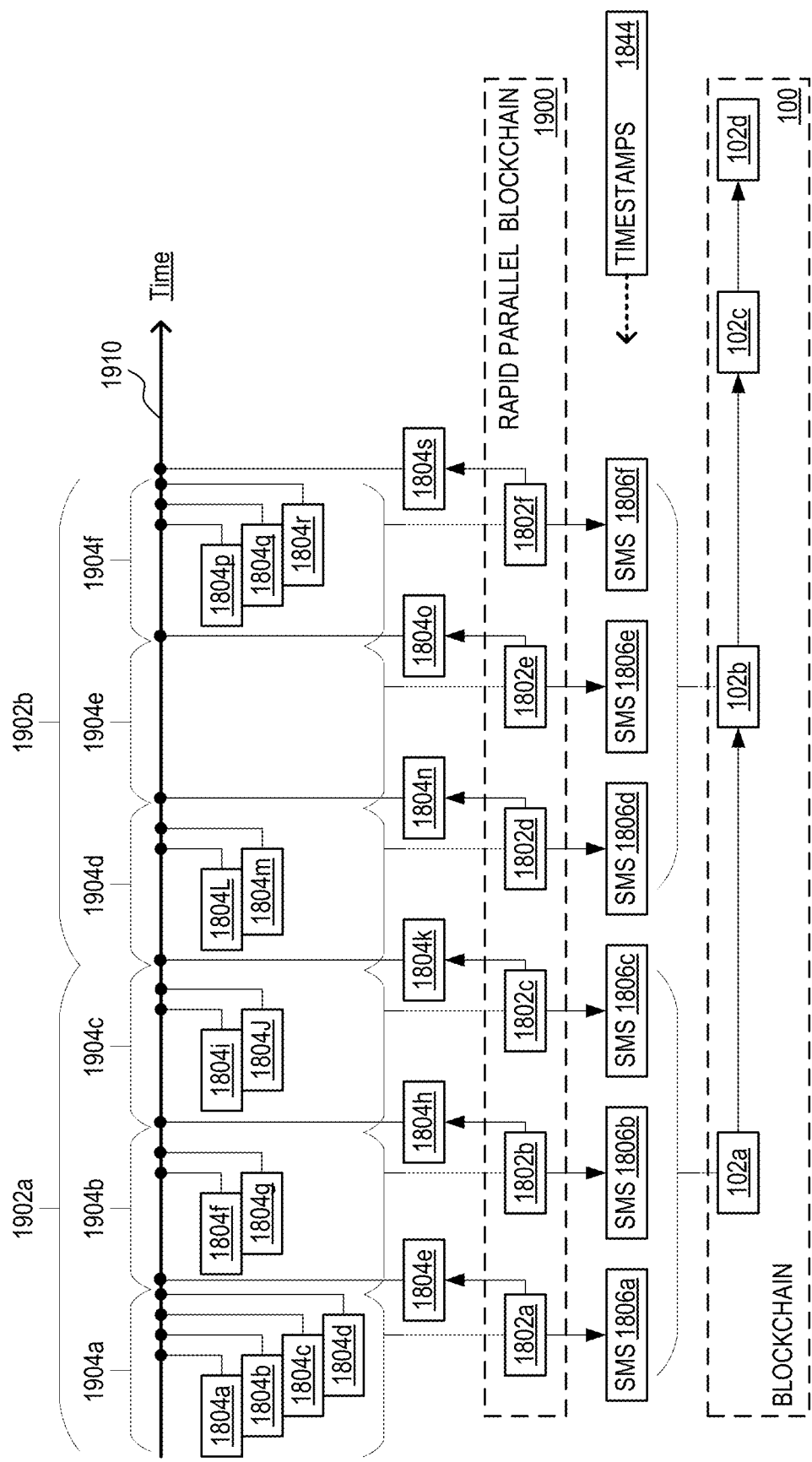
FIG. 19 illustrates a timeline of using network messages for timestamping a block in a blockchain.

FIG. 19 illustrates a timeline 1910 of using network messages for timestamping blocks. A rapid parallel blockchain 1900 runs in parallel with blockchain 100, but has a finer time resolution, for example a resolution on the order of a minute or an hour. In some examples, permissioning entity 101 may also manage blockchain 1900. Although blockchain 1900 has a finer time resolution than blockchain 100, and so thus may provide greater value in the context of tracking cryptocurrency transactions or critical event timing for digital evidence, blockchain 1900 provides only inherent ordinal timing proof and, for some time resolutions, cannot match the time resolution with a printed public record (e.g., a printed publication, such as a newspaper ad). Cardinal timing proof may, in some examples, be provided externally by another entity, such as a cellular network carrier that stores SMS with timestamps, such as timestamps 1844 of FIG. 18. Such timing data, being in the control of an entity that may have no interest in facilitating the operation or value of blockchain 1900, may eventually disappear. And further, it is not truly independently verifiable, as anyone challenging the timing of a record within blockchain 1900 must trust the accuracy of the timestamps—which may require trusting the entity generating and storing the timestamps (e.g., messaging network 1840 of FIG. 18). Fortunately, however, the cardinal timing of the contents of blockchain 1900 are independently verifiable using blockchain 100, although at the coarser time resolution of blockchain 100.

In some scenarios, as time lapses, the need for finer time resolution lessens. Consider, for example, cryptocurrency transactions. If a cryptocurrency holder is attempting to spend a particular cryptocurrency unit that was received only a matter of hours prior, blockchain 1900 may be able to establish that the cryptocurrency holder is the proper owner. However, the transaction in which the cryptocurrency holder received the particular cryptocurrency unit may not yet be established by blockchain 100. In this scenario, the potential recipient, such as a retailer that accepts the cryptocurrency, does not trust blockchain 1900, because the retailer does not trust timestamps created by a messaging network operator. However, the potential recipient does trust blockchain 100, because blockchain 100 is independently verifiable. When sufficient time has passed that blockchain 100 can verify the transaction (in which the cryptocurrency holder received the particular cryptocurrency unit), the cryptocurrency holder will be able to spend the cryptocurrency unit with potential recipients that only trust blockchain 100 but not blockchain 1900.

In some examples, rapid parallel blockchain 1900 issues new blocks on the order of a minute, using SMS messages 1806a-1806f for timestamping. Although such timestamps (e.g., timestamps 1844) have a finer resolution than the intervals between public records 112a, 112b, and 112c, the timestamps are under the control of messaging network 1840. This means that, to at least some extent, messaging network 1840 must be trusted to timestamp network messages accurately. For long term storage, when messaging network 1840 no longer has any interest in maintaining timestamp data and copies of network messages, the reliability of the timestamps may be determined by the reliability of the entity controlling the long term storage of the messages.

This is where the inclusion of the blocks 1802a-1802f of rapid parallel blockchain 1900 within blockchain 100 provides value (and also including network messages 1806a-1806f within blockchain 100). In the long term, it can be established that the initially-applied timestamps (by messaging network 1840) had not been altered. Even if messaging network 1840 ceases operations and all of its records are lost. Blockchain 100 may run at a rate in which new blocks are generated hourly, daily, at set intervals each day, or some other interval (which may vary). For example, blocks for blockchain 100 may be generated at 9 am, noon, and 5 pm in selected time zones, such as one or more of Coordinated Universal Time (UTC), Eastern US, Pacific US, Japan Standard Time, and others. In some examples, blocks for blockchain 100 may be generated at different time intervals on weekends and holidays. Although, in some examples, publication intervals for public records 112a, 112b, and 112c (of FIGS. 1A and 18) may be daily or slower, if blocks for blockchain 100 are generated at a more rapid rate, multiple IVCs for the multiple closed blocks closed (during each publication interval) may be published in each of public records 112a, 112b, and 112c. For example, public record 112a may have nine advertisements representing three block closing times (9 am, noon, and 5 pm) in each of three time zones.

In operation, records 1804a-1804d arrive during a time window 1904a, and are included in block 1802a. Block 1802a becomes part of blockchain 1900. Network message 1806a is generated from block 1802a for broadcast, and is timestamped. Record 1804e is generated for block 1802a during a next time window 1904b. Additional records 1804f and 1804g arrive during time window 1904b. Records 1804e-1804g are included in block 1802b. Record 1804e chains blocks 1802a and 1802b, and block 1802b becomes part of blockchain 1900. Network message 1806b is generated from block 1802b for broadcast, and is timestamped. Record 1804h is generated for block 1802b during a next time window 1904c. Additional records 1804i and 1804J arrive during time window 1904c. Records 1804h-1804J are included in block 1802c. Record 1804h chains blocks 1802b and 1802c, and block 1802c becomes part of blockchain 1900. Network message 1806c is generated from block 1802c for broadcast, and is timestamped. Record 1804k is generated for block 1802c during a next time window 1904d. Additional records 1804L and 1804m arrive during time window 1904d.

Records 1804k-1804m are included in block 1802d. Record 1804k chains blocks 1802c and 1802d, and block 1802d becomes part of blockchain 1900. Network message 1806d is generated from block 1802d for broadcast, and is timestamped. Record 1804n is generated for block 1802d during a next time window 1904e. No additional records arrive during time window 1904e, so only records 1804n is included in block 1802e. Record 1804n chains blocks 1802d and 1802e, and block 1802e becomes part of blockchain 1900. Network message 1806e is generated from block 1802e for broadcast, and is timestamped. Record 1804o is generated for block 1802e during a next time window 1904f. Additional records 1804p, 1804q, and 1804r arrive during time window 1904c. Records 1804o-1804r are included in block 1802f. Record 1804o chains blocks 1802e and 1802f, and block 1802f becomes part of blockchain 1900. Network message 1806f is generated from block 1802f for broadcast, and is timestamped. Record 1804s is generated for block 1802d during a next time window, and this process repeats. Blocks 1802a-1802f and possibly also network messages 1806a-1806f are put into blockchain 100. As illustrated, time windows 1904a-1904c are portions of time window 1902a, so blocks 1802a-1802c of blockchain 1900 become part of block 102a of blockchain 100. Time windows 1904d-1904f are portions of time window 1902b, so blocks 1802d-1802f of blockchain 1900 become part of block 102b of blockchain 100. In some examples, the ratio of the number of time windows for blocks of blockchain 1900 to the number of time windows for blocks of blockchain 100 are significantly different, such as on the order of hundreds or even thousands.

Figure 20:
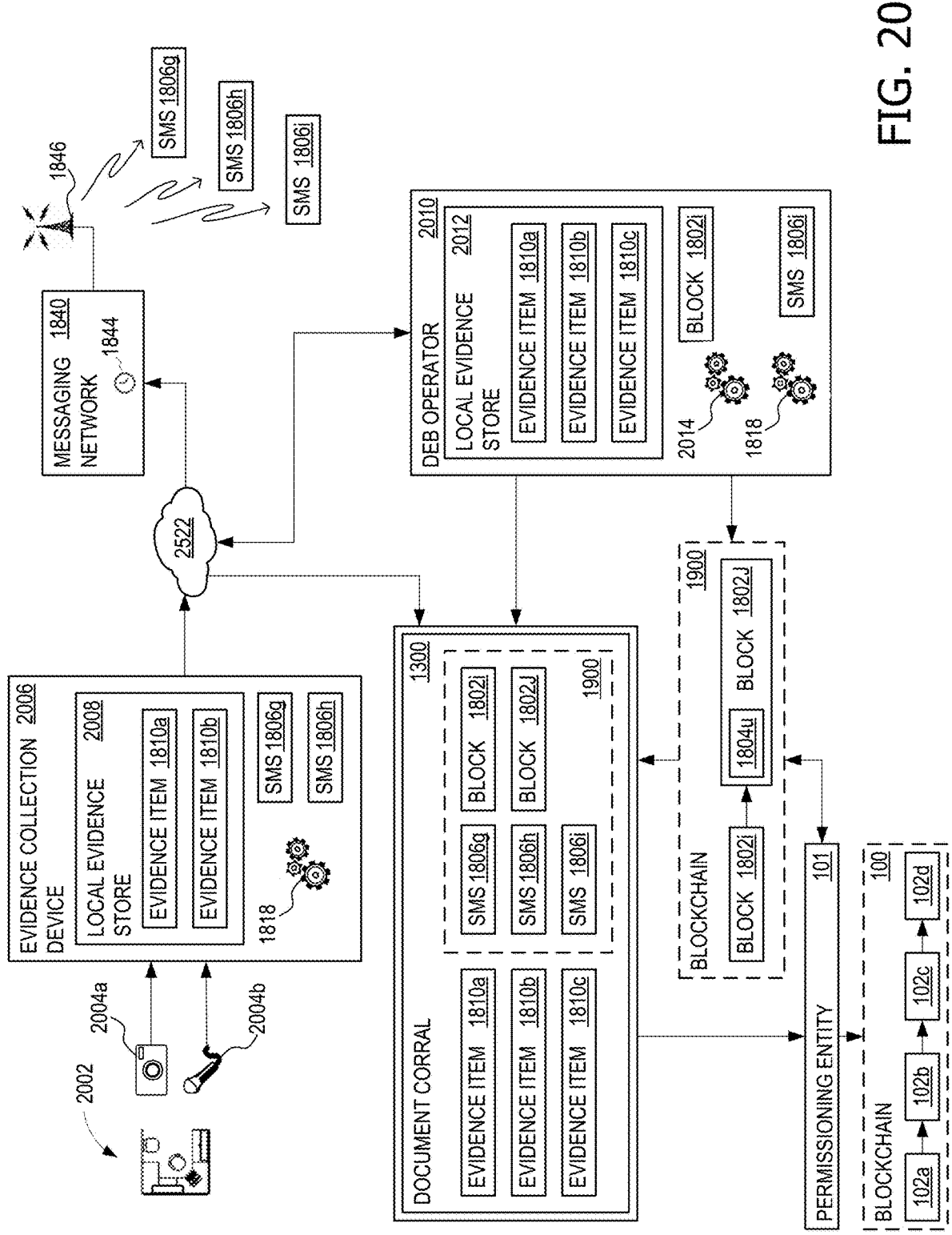
FIG. 20 illustrates the use of a digital evidence bag (DEB) with a blockchain.

FIG. 20 illustrates the use of a digital evidence bag (DEB) with blockchain 100, and optionally rapid parallel blockchain 1900. Evidence is collected digitally from a scene 2002 using sensor 2004a and sensor 2004b of an evidence collection device 2006. In some examples, sensors 2004a and 2004b comprise a camera and a microphone, respectively, although a different set and number of sensors may be used. Evidence collection device 2006 has a local evidence store 2008 that holds evidence item 1810a and evidence item 1810b, collected from scene 2002. In some examples, evidence collection device 2006 is an instance of intake 1812 (of FIG. 18). In some examples, a network message generator 1818 on evidence collection device 2006 generates a network message 1806g and a network message 1806h. In some examples, network messages 1806g and 1806h comprise SMS messages.

Evidence collection device 2006 sends evidence items 1810a and 1810b to a DEB operator 2010 over a network 2522. DEB operator 2010 has a local evidence store 2012 that holds evidence items 1810a and 1810b from evidence collection device 2006, and also evidence item 1810c from potentially another source. DEB operator 2010 has a rapid block generator 2014 that generates a rapid block for all evidence items collected within a prior time period, such as the prior two minutes. For example, a record may be generated for each of evidence items 1810a-1810c, and placed into a block 1802i. In some examples, DEB operator 2010 has a network message generator 1818 that generates network message 1806i (for example, an SMS) indicating block 1802i, for example using the processes described in relation to FIG. 18.

Messaging network 1840 receives network messages 1806g-1806i for broadcast (e.g., over public network 1846), timestamps them, and stores their timestamps in timestamps 1844. Messaging network 1840 may receive network messages from any of evidence collection device 2006, DEB operator 2010, and even permissioning entity 101. Document corral has copies of evidence items 1810a-1810c, network messages 1806g-1806i, and block 1802i. Document corral may receive various ones of these from any of evidence collection device 2006, DEB operator 2010, and messaging network 1840. When a subsequent block 1802J is chained to block 1802i by holding a record 1804u that includes an IVC for block 1802*i*, a portion of blockchain 1900 is formed. In some examples, DEB operator 2010 and/or permissioning entity 101 may manage blockchain 1900. Blockchain 1900 provides time and integrity proof for at least evidence items 1810*a* and 1810 because IVCs (hash values) for evidence items 1810*a* and 1810 are contained within block 1802*i*. Blockchain 100 also provides integrity proof for at least evidence items 1810*a* and 1810 because the contents of blockchain 1900 are within blockchain 100. The date resolution for blockchain 100 is coarser, on the order of days, rather than a minute or so.

Figure 21:
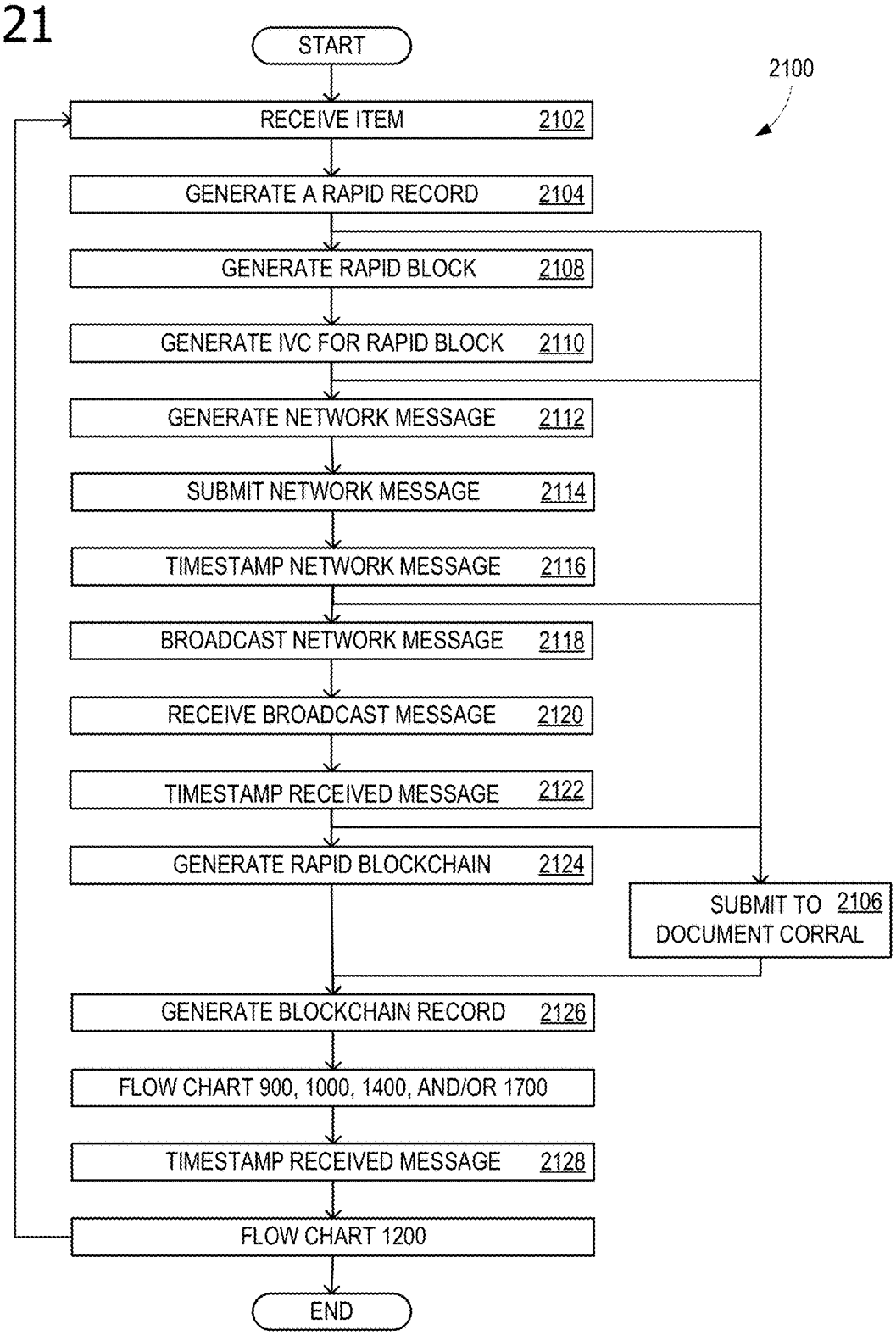
FIG. 21 illustrates a flowchart of operations associated with using network messages for timestamping a block in a blockchain.

FIG. 21 illustrates a flowchart 2100 of operations associated with using network messages for timestamping a block in blockchain 100. In some examples, at least a portion of flowchart 2100 is performed using one or more computing devices 2500. Operation 2102 includes receiving an item at an intake. In some examples, the first item is an electronic document. In some examples, the electronic document comprises at least one item selected from the list consisting of an image, an audio recording, a video recording, and a word processing document. In some examples, the intake comprises an evidence collection device comprising a sensor. In some examples, the sensor comprises at least one sensor selected from the list consisting of a camera, an infrared image sensor, and RF sensor, a microphone, and an ultrasonic sensor. In some examples, the evidence collection device includes a local evidence store containing the received item as an evidence item. In some examples, the evidence collection device submits the evidence item to a DEB operator, and receiving an item at an intake comprises the DEB operator receiving the evidence item from the evidence collection device.

Operation 2104 includes generating a first rapid record, the first rapid record comprising an IVC for the item. Thus, operation 2104 includes generating the IVC. In some examples, the IVC comprises a hash value comprising a complete message digest. In some examples, the IVC comprises a hash value comprising a partial message digest. In some examples, the IVC comprises a hash value comprising two message digests. In some examples, the IVC comprises a mixture of partial and complete message digests. In some examples, the hash value includes one or more portions of the SHA-1, SHA-224, SHA-256, SHA-384, and the SHA-512 message digests. In some examples, the first rapid record comprises an index value. At this point it is optional to add the first rapid record to a document corral for inclusion in a date-provable blockchain. Operation 2106 includes entering the first rapid record into the document corral. In some examples, operation 2106 includes submitting the evidence item to a document corral by the evidence collection device and/or the DEB operator.

Operation 2108 includes generating a first rapid block comprising the first rapid record and a second rapid record. In some examples, the first rapid block comprises an index value. In some examples, the first rapid block comprises an IVC (hash value, message digest) for a prior rapid block, thereby chaining the first rapid block and the prior rapid block. Operation 2110 includes generating an IVC for the first rapid block. At this point it is optional to add the first rapid block to the document corral, so operation 2106 includes entering the first rapid block into the document corral. Operation 2112 includes generating a network message indicating the first rapid record. In some examples, the network message indicating the first rapid record comprises at least a portion of the first rapid record. In some examples, the network message indicating the first rapid record comprises at least the IVC of the first rapid block. In some examples, the network message comprises an SMS message or a social media post. In some examples, the evidence collection device generates a network message indicating the evidence item. In some examples, the DEB operator generates the network message indicating the evidence item.

Operation 2114 includes submitting the network message indicating the first rapid record to a public messaging network for broadcasting. In some examples, the evidence collection device submits the network message indicating the evidence item to a public messaging network for broadcasting. In some examples, the DEB operator submits the network message indicating the evidence item to the public messaging network for broadcasting. Operation 2116 includes timestamping, by the public messaging network, the network message indicating the first rapid record. At this point it is optional to add a copy of the network message to the document corral, so operation 2106 includes entering a copy of the network message into the document corral. In some examples, operation 2106 also includes entering the timestamp of the network message into the document corral. Operation 2118 includes broadcasting, by the public messaging network, the network message indicating the first rapid record over a public medium. In some examples, broadcasting includes sending the network message over a wired network and/or a wireless network to paid subscribers.

Operation 2120 includes receiving the broadcast network message at a monitoring node. In some examples the monitoring node is also a DEB operator. Operation 2122 includes timestamping the received broadcast network message. At this point it is optional to add a copy of the received broadcast network message to the document corral, so operation 2106 includes entering the received broadcast network message into a document corral. In some examples, operation 2106 also includes entering the timestamp of the received broadcast network message into the document corral.

Operation 2124 includes generating a rapid blockchain comprising the prior rapid block, the prior rapid block, and a subsequent rapid block. In some examples, the subsequent rapid block comprises an IVC (hash value, message digest) for the first rapid block, thereby chaining the subsequent rapid record and the first rapid block. In some examples, blocks of the rapid blockchain are generated at time intervals of two minutes or less. In some examples, blocks of the rapid blockchain are generated at time intervals of an hour or less. Although the rapid blockchain uses timestamps provided by the public messaging network, which may not be a trusted timestamping entity (TTE), the rapid blockchain does provide higher time resolution than the slower blockchain which does have provable dates. Fortunately, the slower blockchain provides a provable date, although with coarser time resolution. Operation 2126 includes generating a blockchain record indicating the first rapid record. In some examples, the blockchain record indicating the first rapid record comprises the first rapid record. In some examples, the blockchain record indicating the first rapid record comprises the first rapid block. In some examples, the blockchain record indicates the first rapid record comprises a timestamp for the first rapid block. In some examples, operation 2126 is part of a larger operation that includes generating blockchain records for the first blockchain from entries in the document corral.

The first blockchain record is added into the slower blockchain, using one or more of flowcharts 900, 1000, 1400, and 1700. In some examples, a block of the first blockchain comprises multiple blocks of the rapid blockchain. In some examples, blocks of the first blockchain are generated at time intervals of an hour or less. In some examples, blocks of the first blockchain are generated at time intervals of a day or less. In some examples, blocks of the first blockchain are generated according to a schedule at a set of selected times in a set of selected time zones. In some examples, the schedule varies according to holiday. For later proving the date and integrity of the item received in operation 2102, operation 2128 includes retrieving a timestamp from the public messaging network, such as a timestamp generated in operation 2116 and/or operation 2122. Flowchart 1200 completes the proof, with the retrieved timestamp providing finer time resolution.

Figure 22:
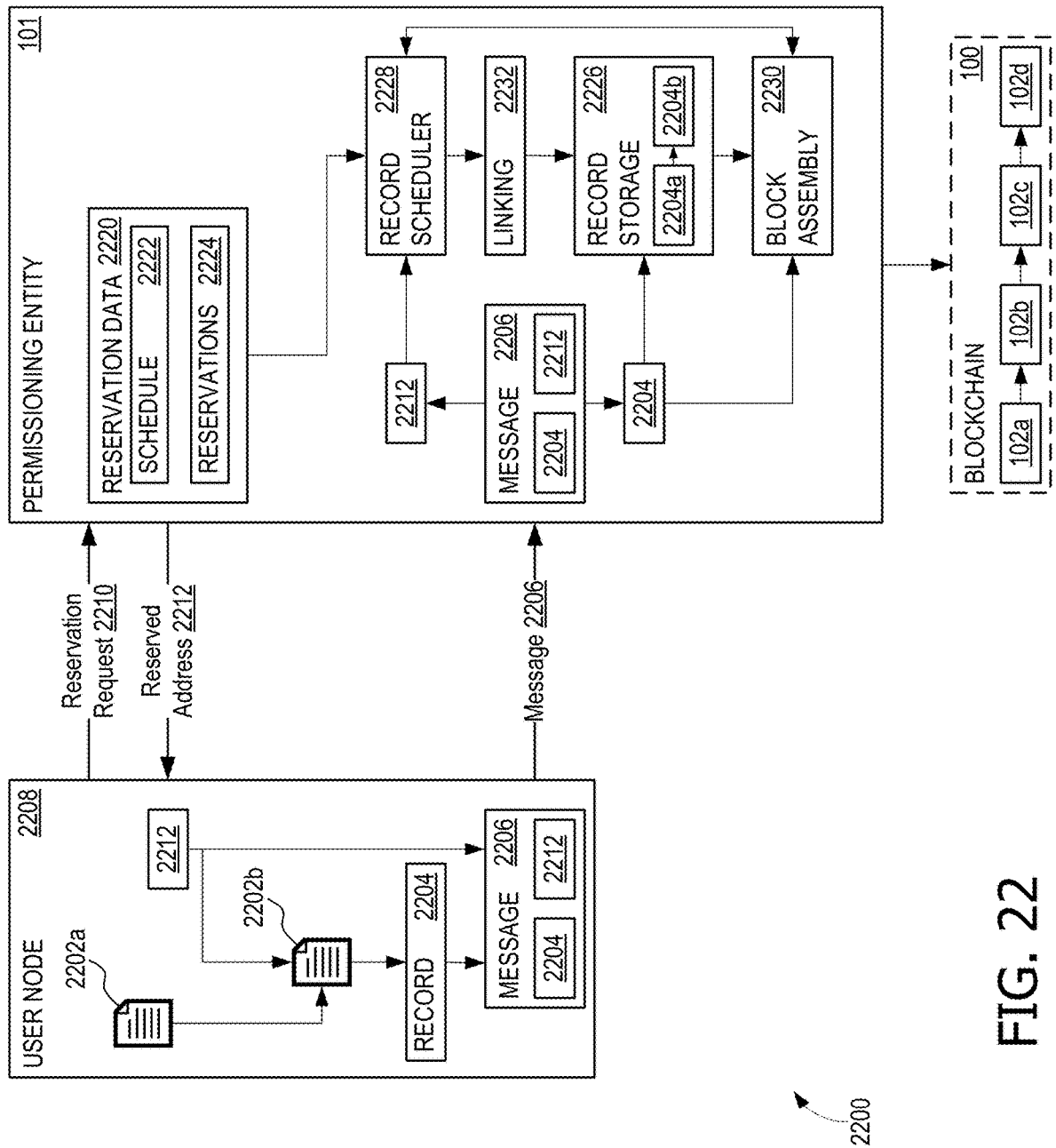
FIG. 22 illustrates an arrangement of data for self-addressed blockchain registration (SABRe).

FIG. 22 illustrates an arrangement of data for a self-addressed blockchain registration (SABRe). A user at a user node 2208 intends to register a document 2208a in blockchain 100, and so makes a reservation request 2210 requesting a reserved blockchain address. In some examples, reservation request 2210 includes a specific date and a specific time. In some examples, reservation request 2210 indicates a time period, such as no-earlier-than and no later-than dates. Permissioning entity 101 receives reservation request 2210 and uses reservation data 2220 to determine a reserved blockchain address 2212. Reserved blockchain address 2212 may include an identified block number and may also include an index number within that identified block, similarly to blockchain address 518 (of FIG. 5). That is, in some examples, reserved blockchain address 2212 includes both a block ID and an index value. For example, permissioning entity 101 maintains a schedule 2222 for generating upcoming blocks, identifies one or more blocks matching the requested date, selects a block, and enters reserved blockchain address 2212 into a list of reservations 2224.

Upon receiving reserved blockchain address 2212, the user enters it (or a suitable indication) into document 2208a to make it into document 2208b. The user generates a blockchain record 2204 for document 2202b. Document 2202b now is able to indicate its own blockchain registration, and when hashed at a later time (e.g., during verification in order to resolve a dispute), will reproduce the hash value (IVC) within the record that it indicates internally. This capability is not currently achievable with any other blockchain, other than PEDDaL®.

User node 2208 generates a message 2206 including record 2204 and reserved blockchain address 2212 and transmits message 2206 to permissioning entity 101. Permissioning entity 101 receives message 2206 that associates record 2204 with reserved blockchain address 2212. Permissioning entity 101 identifies reserved blockchain address 2212 within reservations 2224 and uses a record scheduler 2228 to scheduling inclusion of record 2204 in blockchain 100 according to reserved blockchain address 2212. If record 2204 is not received in time, but reserved blockchain address 2212 had included a reserved index value, permissioning entity may zero pad the location within the scheduled block that corresponds to the reserved index (or just put in a different record at that location).

Record 2204 is placed into a record storage 2226 to await its scheduled block. If record 2204 is received early enough prior to the generation of the scheduled block, permissioning entity 101 may also include record 2204 in an earlier block as an early record. A linking component 2232 generates a linked record locating field (e.g., record locator field 502p) with reserved blockchain address 2212, to turn record 2204 into record 2204a. A block assembly component 2230 puts records into blocks for blockchain 100, including record 2204a. Upon the generation period for the scheduled block, if an early record had appeared in an earlier block, linking component 2232 generates a linked record locating field with the blockchain address of that earlier record (record 2204a), to turn record 2204 into record 2204b. Block assembly component 2230 puts record 2204b (or record 2204, if there is no linking information) into blockchain 100 as scheduled (possibly also at the scheduled index position).

Figure 23:
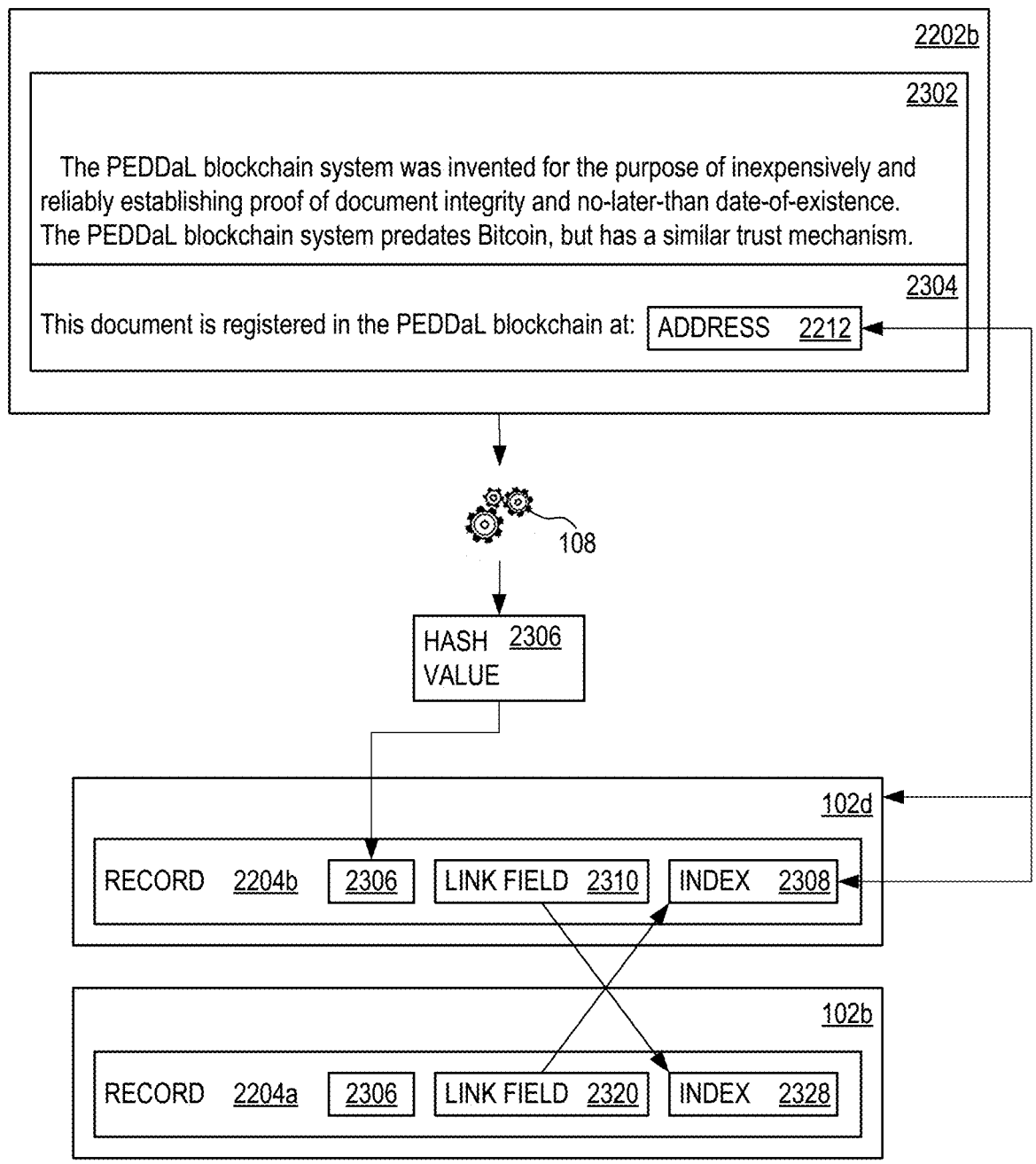
FIG. 23 illustrates additional detail an arrangement of data for a SABRe-enabled blockchain.

FIG. 23 illustrates additional detail an arrangement of data for a SABRe-enabled blockchain. Document 2202b has a document content section 2302 and a SABRe reference section 2304. SABRe reference section 2304 includes an indication of a reserved blockchain address 2212. In some examples, reserved blockchain address 2212 includes both a block number and an index value, such as the number of block 102d and the value of index 2308. In some examples, reserved blockchain address 2212 does not include an index value.

IVC generator 108 generates a hash value 2306 for document 2202b. A record generator (not shown) includes IVC generator 108 and places hash value 2306 (or another IVC, as generated by IVC generator 108) within scheduled record 2204b. As illustrated, early record 2204a has the same hash value 2306. This is because early record 2204a and scheduled record 2204b are both for the same document 2202b. As illustrated, early record 2204a, has a linked record value in a linked record field 2320 that indicating a blockchain address (e.g., the number of block 102d and the value of index 2308) of scheduled record 2204b. Also as illustrated, scheduled record 2204b, has a linked record value in a linked record field 2310 that indicating a blockchain address (e.g., the number of block 102b and the value of index 2328) of early record 2204a.

Anyone possessing a copy of document 2202b can locate scheduled record 2204b using the indication of reserved blockchain address 2212 in document 2202b. This permits determining integrity or a no-later-than date of existence for document 2202b using scheduled record 2204b. However with linked records, finding scheduled record 2204b enables locating early record 2204a using the linked record value (within scheduled record 2204b) for early record 2204a. This permits determining integrity or a no-later-than date of existence for document 2202b using early record 2204a. In some scenarios, this earlier provable date may be valuable.

In some examples, the SABRe reference section 2304 is printed in a footer of a document, so that the blockchain registration is easily located by anyone who sees any copy of the document. Such examples thus include printing a blockchain address (blockchain registration address) of a blockchain record (for the document) on a copy of the document itself. This may be performed in combination with use of a daisy chained record, a document corral, a quarantine-enabled document corral, a network message for timestamping, a rapid parallel blockchain, a DEB, and/or other examples described herein.

A real-world example exists for the PEDDaL® blockchain. The text shown in document content section 2302 and SABRe reference section 2304 are in an ASCII text file (so no metadata or other extraneous word processing file data to throw off the hash values), with a single space between "experience." and "The PEDDaL", and a single carriage return between "mechanism." and "This document". After "at:" there is a single space, followed by "191205a0000A5" in lieu of the text window placeholder for reserved blockchain address 2212. There are no other spaces or carriage returns, and text file has 319 bytes (characters). The text document predicts its own blockchain registration, because hashing the text file produces the SHA-512 and SHA-1 message digests found in the record at index value 0xA5 in block 191205a. By recreating the above-described text file carefully, this self-referencing blockchain registration can be independently verified.

Figure 24:
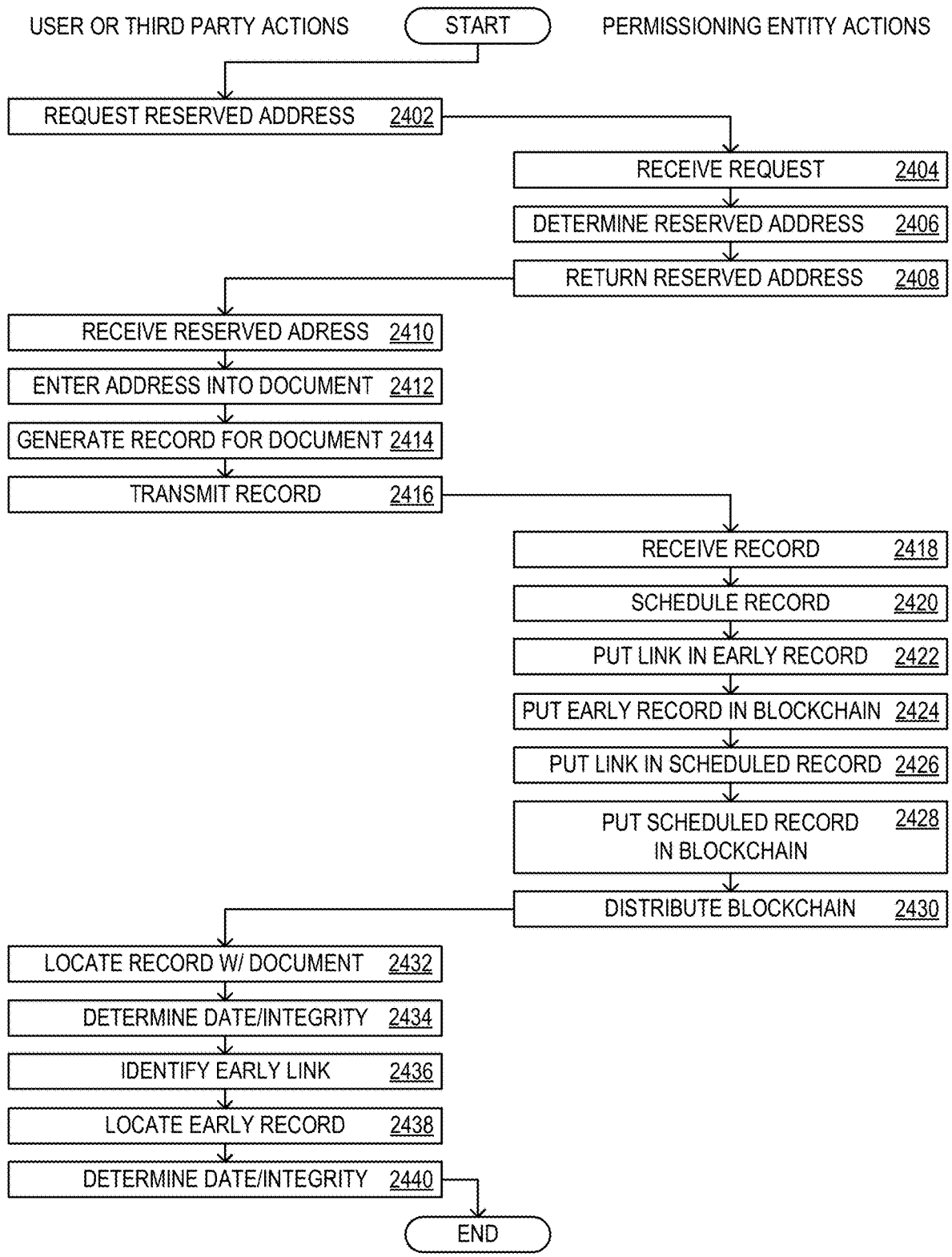
FIG. 24 illustrates a flowchart of operations associated with using a SABRe-enabled blockchain.

FIG. 24 illustrates a flowchart 2400 of operations associated with using a SABRe-enabled version of blockchain 100. In some examples, at least a portion of flowchart 2400 is performed using one or more computing devices 2500. In some examples, the operations described for flowchart 2400 coincide with (or may be replaced by) similar operations described for flowcharts 900, 1000, 1100, 1200, 1400, and/or 1700. As indicated, some operations of flowchart 2400 are performed by a user (or set of people submitting a scheduled record) or a third party performing verification, whereas some are performed by the permissioning entity that produces the blockchain.

Operation 2402 includes requesting a reserved blockchain address. Operation 2404 includes receiving the request to reserve a blockchain address. Operation 2406 includes determining a reserved blockchain address. Operation 2408 includes returning the reserved blockchain address. In some examples, the reserved blockchain address includes both a block ID and an index value. Operation 2410 includes receiving the reserved blockchain address. In some examples, the reserved blockchain address includes both a block ID and an index value.

Now that the document owner has the reserved blockchain address, operation 2412 includes entering an indication of the reserved blockchain address into a document. Operation 2414 includes generating a record for the document. In some examples, generating a record for the document comprises generating a record for a document containing an indication of the reserved blockchain address. Operation 2416 includes transmitting the record for the document with an association of the reserved blockchain address to the permissioning entity, (or some other node that collects records). Operation 2418 includes the permissioning entity receiving a record associated with the reserved blockchain address. Operation 2420 includes scheduling inclusion of the received record in the blockchain according to the reserved blockchain address.

If the record is received while another block is being generated, before the scheduled block, the permissioning entity may also include the record in the earlier block as an early record. The permissioning entity may also put a linked record within the early record for the scheduled record, since the schedule is already known via the reservations. Thus, optional operation 2422 includes including, within an early record, a linked record value indicating a blockchain address of the scheduled record, and operation 2424 includes additionally including the received record, as an early record, in the blockchain in an earlier block, prior to the schedule. Operation 2426 includes including, within the scheduled record, a linked record value indicating a blockchain address of the early record. Operation 2428 includes including the received record, as a scheduled record, in the blockchain according to the schedule. Operation 2430 includes distributing copies of the blockchain outside the control of a permissioning entity of the blockchain, such that the permissioning entity is unable to alter the blockchain without detection. In some examples, distributing copies of the blockchain outside the control of a permissioning entity of the blockchain comprises publishing the blockchain on a website.

At a later time, when the document requires date and/or integrity verification, operation 2432 includes locating the scheduled record within the blockchain using the indication of the reserved blockchain address in the document. If somehow, the early record had already been located, it is also possible to identify, within a linked record locator field of the early record, a linked record value for the scheduled record. This then permits locating the scheduled record within the blockchain using the linked record value for the scheduled record. Operation 2434 includes determining integrity or a no-later-than date of existence for the document using the scheduled record in the blockchain. In some examples, determining integrity for a document comprises generating an IVC for the document and comparing the generated IVC for the document with a recorded IVC within a record within the blockchain. In some examples, determining a no-later-than date of existence for a document comprises hashing the document, comparing a resulting hash value with a recorded hash value within the blockchain. In some examples, determining a no-later-than date of existence for a block of the blockchain that contains the recorded hash value.

Since the address of the scheduled record is identified within the document, is may be easier to initially locate the scheduled record. However, if an early record had also been generated and linked, it is possible to locate the early record using the scheduled record. Thus, operation 2436 includes identifying, within a linked record locator field of the scheduled record, a linked record value for the early record. Operation 2438 includes locating the early record within the blockchain using the linked record value for the early record. Operation 2440 includes determining integrity or a no-later-than date of existence for the document using the early record in the blockchain.

Some aspects and examples disclosed herein are directed to a method of using a first blockchain to generate evidence for proving document integrity, the method executable by a processor, the method comprising: generating, for a document, a first record in a first format, the first format comprising: an IVC field comprising a first IVC portion; an index field; and a linked record locator field; wherein the first record comprises: a first IVC value in the first IVC portion of the first record; a first index value in the index field of the first record; and a first linked record value in the first linked record locator field of the first record; and generating, in the first blockchain, a first block comprising the first record, wherein the first linked record value indicates a location of a second record in the first blockchain.

Alternatively, or in addition to the other examples described herein, examples include any combination of the following:

the first linked record value comprises a blockchain address for another record;
the IVC field further comprises a second IVC portion, the record further comprises a second IVC value in the second IVC portion, the second IVC value represents a same document as the first IVC value, and the second IVC value represents an output of a different integrity verification function than the first IVC value;
the first IVC value comprises at least a portion of a SHA value;
the first IVC value comprises at least a portion of a hash value (message digest of a hash function);
the SHA is at least one selected from the list consisting of: SHA-1, SHA-224, SHA-256, SHA-348, and SHA-512;
the first format further comprises a timestamp field, and the first record further comprises a timestamp value in the timestamp field;
the first format further comprises a generator version field, and the first record further comprises generator version information in the generator version field;

the first format has a fixed number of bytes;
the first format is 256 bytes long;
the location of the second record is within the first block;
the second record is in the first format and the second record comprises: a second IVC value in the first IVC portion of the second record; and a second index value in the index field of the second record;
the second record further comprises: the first index value in the first linked record locator field of the second record;
the second record further comprises: a third index value in the first linked record locator field of the second record;
the second record further comprises: a block name in the first linked record locator field of the second record;
the location of the second record is within a second blockchain;
the location of the second record is within a first prior block that is prior to the first block in the first blockchain;
the second record comprises a location of a third record, thereby linking the first record with the third record in a daisy chain;
the location of the third record is within a second prior block that is prior to the first prior block in the first blockchain; and
printing a blockchain address of a blockchain record on a copy of the document.

Some aspects and examples disclosed herein are directed to a method of using a blockchain to generate evidence for proving document integrity, the method executable by a processor, the method comprising: providing a document corral; based at least on permissions set for external entities, granting external entities access to the document corral; monitoring documents within the document corral for additions and alterations; based at least upon detecting an addition or alteration of a first document within the document corral, generating a blockchain record for the first document; and adding the blockchain record into the blockchain.

Alternatively, or in addition to the other examples described herein, examples include any combination of the following:
generating the blockchain;
receiving new documents into the document corral;
altering documents within the document corral;
generating a blockchain record for the first document includes generating a blockchain record with a linked record value;
the linked record value indicates a prior version of the first document;
the linked record value indicates a second document that is related to the first document;
the linked record value comprises a blockchain address;
a relationship of the second document with the first document is established by the first document and the second document being attached to a common electronic message;
generating the block upon a trigger event;
the trigger event comprises a schedule or a threshold number of new records awaiting entry into the blockchain;
distributing copies of the blockchain outside the control of a permissioning entity of the blockchain, such that the permissioning entity is unable to alter the blockchain without detection;
distributing copies of the blockchain outside the control of a permissioning entity of the blockchain comprises publishing the blockchain on a website;
retrieving documents from the document corral;
ensuring that a set of retrieved documents is complete;
ensuring that a set of retrieved documents is complete comprises traversing linked record locator fields to rebuild a daisy chain of document relationships;
based at least on determining that documents are missing, generating an alert; and
printing a blockchain address of a blockchain record on a copy of the document.

Some aspects and examples disclosed herein are directed to a method of using a blockchain to generate evidence for proving document integrity, the method executable by a processor, the method comprising: providing a document corral and a document quarantine; generating a first blockchain record for a first document; adding the first blockchain record into the blockchain; identifying that the first document is to be quarantined; based at least upon determining that the first document is to be quarantined, moving the first document into the document quarantine; generating a second document as a replacement for the first document in the document corral, the second document not triggering quarantine; generating a second blockchain record for the second document; and adding the second blockchain record into the blockchain.

Alternatively, or in addition to the other examples described herein, examples include any combination of the following:
generating the blockchain;
entering the first blockchain record into the blockchain;
monitoring documents within the document corral for quarantine triggers;
quarantine triggers are selected from the list consisting of: privacy violations, intellectual property rights violations, malicious logic, and obscenity;
removing the first document from the document corral;
generating the second document from the first document by removing material that triggered quarantine;
generating the second document as a summary of the first document;
generating a cleaned reference document;
the cleaned reference document includes at least one item selected from the list consisting of: identification of the first document, identification of a quarantine location of the first document, a blockchain address of the first record, identification of the second document, a blockchain address of the second record;
generating a second blockchain record for the second document includes generating a blockchain record with a linked record value;
the linked record value indicates a blockchain address of the first record;
the linked record value indicates the first document;
the linked record value indicates quarantine storage;
distributing copies of the blockchain outside the control of a permissioning entity of the blockchain, such that the permissioning entity is unable to alter the blockchain without detection;
distributing copies of the blockchain outside the control of a permissioning entity of the blockchain comprises publishing the blockchain on a website;
retrieving the second document from the document corral;
determining integrity or a no-later-than date of existence for the second document using the blockchain;

determining integrity for a document using the blockchain comprises generating an IVC for the document and comparing the generated IVC for the document with a recorded IVC within a record within the blockchain;

determining a no-later-than date of existence for a document using the blockchain comprises hashing the document; comparing a resulting hash value with a recorded hash value within the blockchain; and determining a no-later-than date of existence for an earliest block of the blockchain that contains the recorded hash value;

determining a no-later-than date of existence for a document using the blockchain comprises generating an IVC for the document; comparing the generated IVC for the document with a recorded IVC within a record within the blockchain; and determining a no-later-than date of existence for an earliest block of the blockchain that contains the recorded IVC;

identifying, within a linked record locator field of the second blockchain record, a linked record value for the first blockchain record;

identifying, within a linked record locator field of the second blockchain record, a linked record value for the first document;

locating the first blockchain record within the blockchain;

determining a no-later-than date of existence for the first document using the blockchain and the first blockchain record;

receiving, from a trusted entity, assurance that the first blockchain record matches the first document;

retrieving the first document from the document quarantine;

determining integrity or a no-later-than date of existence for the first document using the blockchain; and printing a blockchain address of a blockchain record on a copy of the document.

Some aspects and examples disclosed herein are directed to a method of using a blockchain to generate evidence for proving document integrity, the method executable by a processor, the method comprising: receiving an item at an intake; generating a first rapid record, the first rapid record comprising an IVC for the item; generating a network message indicating the first rapid record; submitting the network message indicating the first rapid record to a public messaging network for broadcasting; generating a blockchain record indicating the first rapid record; and adding the blockchain record into a first blockchain.

Alternatively, or in addition to the other examples described herein, examples include any combination of the following:

the first item is an electronic document;

the electronic document comprises at least one item selected from the list consisting of: an image, an audio recording, a video recording, and a word processing document;

the IVC comprises a hash value comprising a complete message digest;

the IVC comprises a hash value comprising a partial message digest;

the IVC comprises a hash value comprising two message digests;

the IVC comprises a mixture of partial and complete message digests;

the hash value includes one or more portions of the SHA-1, SHA-224, SHA-256, SHA-384, and the SHA-512 message digests;

the first rapid record comprises an index value;

entering the first rapid record into a document corral;

the blockchain record indicates the first rapid record comprises the first rapid record;

the network message indicates the first rapid record comprises at least a portion of the first rapid record;

generating a first rapid block comprising the first rapid record and a second rapid record;

the first rapid block comprises an index value;

entering the first rapid block into a document corral;

the blockchain record indicates the first rapid record comprises the first rapid block;

generating an IVC for the first rapid block;

the network message indicates the first rapid record comprises at least the IVC of the first rapid block;

the first rapid block comprises an index value;

broadcasting, by the public messaging network, the network message indicating the first rapid record over a public medium;

timestamping, by the public messaging network, the network message indicating the first rapid record;

the network message comprises an SMS message or a social media post;

broadcasting includes sending the network message over a wired network and/or a wireless network to paid subscribers;

receiving the broadcast network message;

entering the received broadcast network message into a document corral;

timestamping the received broadcast network message;

entering the timestamp of the received broadcast network message into a document corral;

the blockchain record indicates the first rapid record comprises a timestamp for the first rapid block;

the first rapid block comprises an IVC (hash value, message digest) for a prior rapid block, thereby chaining the first rapid block and the prior rapid block;

generating a rapid blockchain comprising the prior rapid block, the prior rapid block, and a subsequent rapid block;

the subsequent rapid block comprises an IVC (hash value, message digest) for the first rapid block, thereby chaining the subsequent rapid record and the first rapid block;

a block of the first blockchain comprises multiple blocks of the rapid blockchain;

blocks of the rapid blockchain are generated at time intervals of two minutes or less;

blocks of the rapid blockchain are generated at time intervals of an hour or less;

blocks of the first blockchain are generated at time intervals of an hour or less;

blocks of the first blockchain are generated at time intervals of a day or less;

blocks of the first blockchain are generated according to a schedule at a set of selected times in a set of selected time zones;

the schedule varies according to holidays;

the intake comprises an evidence collection device comprising a sensor;

the sensor comprises at least one sensor selected from the list consisting of a camera, an infrared image sensor, and RF sensor, a microphone, and an ultrasonic sensor;

the evidence collection device includes a local evidence store containing the received item as an evidence item;

the evidence collection device generates a network message indicating the evidence item;

the evidence collection device submits the network message indicating the evidence item to a public messaging network for broadcasting;

the evidence collection device submits the evidence item to a DEB operator;

the DEB operator generates a network message indicating the evidence item;

the DEB operator submits the network message indicating the evidence item to a public messaging network for broadcasting;

submitting the evidence item to a document corral by the evidence collection device and/or the DEB operator; and generating blockchain records for the first blockchain from entries in the document corral.

Some aspects and examples disclosed herein are directed to a method of using a blockchain to generate evidence for proving document integrity, the method executable by a processor, the method comprising: receiving a request to reserve a blockchain address; returning a reserved blockchain address; receiving a record associated with the reserved blockchain address; scheduling inclusion of the received record in the blockchain according to the reserved blockchain address; and including the received record, as a scheduled record, in the blockchain according to the schedule.

Alternatively, or in addition to the other examples described herein, examples include any combination of the following:

the reserved blockchain address includes both a block ID and an index value;

requesting the reserved blockchain address;

determining the reserved blockchain address;

entering an indication of the reserved blockchain address into a document;

generating a record for a document;

generating a record for a document comprises generating a record for a document containing an indication of the reserved blockchain address;

transmitting the record for the document with an association of the reserved blockchain address;

additionally including the received record, as an early record, in the blockchain in an earlier block, prior to the schedule;

including, within the early record, a linked record value indicating a blockchain address of the scheduled record;

including, within the scheduled record, a linked record value indicating a blockchain address of the early record;

determining integrity or a no-later-than date of existence for the document using the scheduled record in the blockchain;

determining integrity or a no-later-than date of existence for the document using the early record in the blockchain;

identifying, within a linked record locator field of the scheduled record, a linked record value for the early record;

locating the early record within the blockchain using the linked record value for the early record;

identifying, within a linked record locator field of the early record, a linked record value for the scheduled record;

locating the scheduled record within the blockchain using the linked record value for the scheduled record;

locating the scheduled record within the blockchain using the indication of the reserved blockchain address in the document;

determining integrity for a document comprises generating an IVC for the document and comparing the generated IVC for the document with a recorded IVC within a record within the blockchain;

determining a no-later-than date of existence for a document comprises hashing the document; comparing a resulting hash value with a recorded hash value within the blockchain; and determining a no-later-than date of existence for a block of the blockchain that contains the recorded hash value;

distributing copies of the blockchain outside the control of a permissioning entity of the blockchain, such that the permissioning entity is unable to alter the blockchain without detection; and distributing copies of the blockchain outside the control of a permissioning entity of the blockchain comprises publishing the blockchain on a website.

Some aspects and examples disclosed herein are directed to a system comprising: a processor; and a computer-readable medium storing instructions that are operative, upon execution by the processor, to perform operations disclosed herein. Some aspects and examples disclosed herein are directed to one or more computer storage devices having computer-executable instructions stored thereon, which, on execution by a computer, cause the computer to perform operations disclosed herein. While the aspects of the disclosure have been described in terms of various examples with their associated operations, a person skilled in the art would appreciate that a combination of operations from any number of different examples is also within scope of the aspects of the disclosure.

Figure 25:
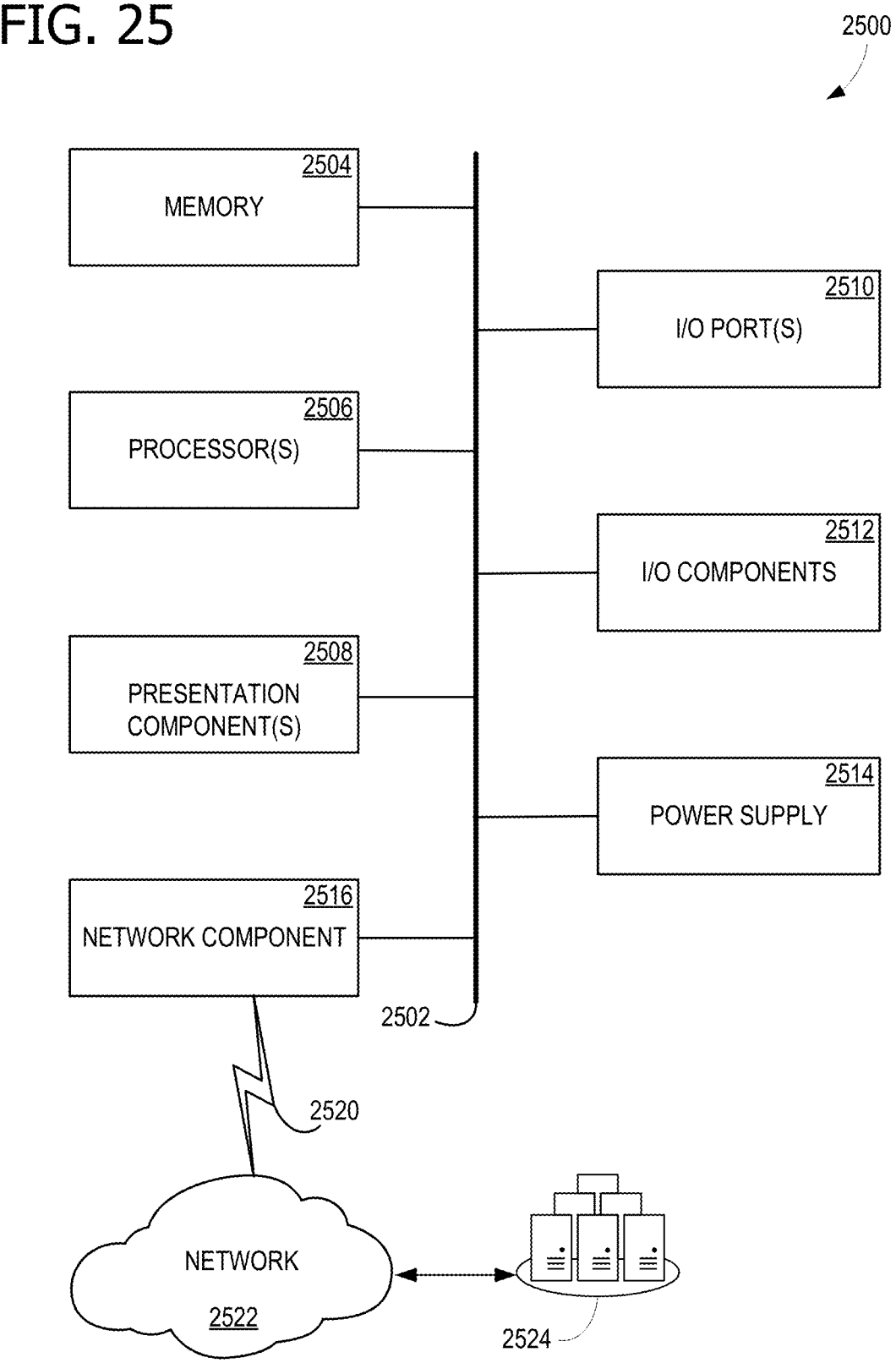
FIG. 25 is a block diagram of an example computing device suitable for implementing some of the various examples disclosed herein.

FIG. 25 is a block diagram of example computing device 2500 for implementing aspects disclosed herein and is designated generally as computing device 2500. Computing device 2500 is one example of a suitable computing environment and is not intended to suggest any limitation as to the scope of use or functionality of the examples disclosed herein. Neither should computing device 2500 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 2500 includes a bus 2502 that directly or indirectly couples the following devices: memory 2504, one or more processors 2506, one or more presentation components 2508, input/output (I/O) ports 2510, I/O components 2512, a power supply 2514, and a network component 2516. Computer device 2500 should not be interpreted as having any dependency or requirement related to any single component or combination of components illustrated therein. While computer device 2500 is depicted as a seemingly single device, multiple computing devices 2500 may work together and share the depicted device resources. For instance, computer-storage memory 2504 may be distributed across multiple devices, processor(s) 2506 may provide housed on different devices, and so on. Bus 2502 represents what may be one or more busses (such as an address bus, data bus, or a combination thereof). Although the various blocks of FIG. 25 are shown with lines for the sake of clarity, example systems may be less delineated. Distinction is not made between such categories as "workstation," "server," "laptop," "hand-held device," etc., as all are contemplated within the scope of FIG. 25 and the references herein to a "computing device."

Computer-storage memory 2504 may take the form of the non-transitory computer-storage media referenced below and operatively provided storage of computer-readable instructions, data structures, program modules and other data for computing device 2500. For example, memory 2504 may store an operating system and other program modules and program data. Memory 2504 may be used to store and access instructions configured to carry out the various operations disclosed herein and may include computer-storage media in the form of volatile and/or nonvolatile memory, removable or non-removable memory, data disks in virtual environments, or a combination thereof. Memory 2504 may include any quantity of memory associated with or accessible by the computing device 2500. Memory 2504 may be internal to the computing device 2500, external to the computing device 2500, or both. Examples of memory 2504 include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 2500. Additionally, or alternatively, memory 2504 may be distributed across multiple computing devices 2500, e.g., in a virtualized environment in which instruction processing is carried out on multiple computing devices 2500. For the purposes of this disclosure, "computer storage media," "computer-storage memory," "memory," and "memory devices" are synonymous terms for memory 2504, and none of these terms include carrier waves or propagating signaling.

Processor(s) 2506 may include any quantity of processing units that read data from various entities, such as memory 2504 or I/O components 2512. Specifically, processor(s) 2506 are programmed to execute computer-executable instructions for implementing aspects of the disclosure. The instructions may be performed by one or more processors 2506 within computing device 2500, or by a processor external to computing device 2500. In some examples, processor(s) 2506 are programmed to execute instructions such as those illustrated in the flowcharts depicted in the accompanying drawings. Moreover, in some examples, processor(s) 2506 represent an implementation of analog techniques to perform the operations described herein. For example, the operations may be performed by an analog computing device 2500 and/or a digital computing device 2500. Presentation component(s) 2508 present data indications to a user or other device. Exemplary presentation components 2508 include a display device, speaker, printing component, vibrating component, etc. One skilled in the art will understand and appreciate that computer data may be presented in a number of ways, such as visually in a graphical user interface (GUI), audibly through speakers, wirelessly between computing devices 2500, across a wired connection, or in other ways. I/O ports 2510 allow computing device 2500 to be logically coupled to other devices including I/O components 2512, some of which may be built in. Example I/O components 2512 include a microphone, joystick, game pad, satellite dish, scanner, printer, wireless device, etc.

Computing device 2500 may operate in a networked environment via network component 2516 using logical connections to one or more remote computers. In some examples, network component 2516 includes a network interface card and/or computer-executable instructions (e.g., a driver) for operating the network interface card. Communication between computing device 2500 and other devices may occur using any protocol or mechanism over any wired or wireless connection. In some examples, network component 2516 is operable to communicate data over public, private, or hybrid (public and private) using a transfer protocol, between devices wirelessly using short range communication technologies (e.g., near-field communication (NFC), Bluetooth™ branded communications, or the like), or a combination thereof. For example, network component 2516 communicates over a communication link 2520, through a network 2522, with a cloud resource 2524. Various examples of communication link 2520 include a wireless connection, a wired connection, and/or a dedicated link, and in some examples, at least a portion is routed through the internet. In some examples, cloud resource 2524 performs at least some of the operations described herein for computing device 2500.

Although described in connection with an example computing device 2500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors, network PCs, minicomputers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein. By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of using a blockchain to generate evidence for proving document integrity, the method executable by a processor, the method comprising:
   reserving a blockchain address in a first block for a first record for a document;
   entering the blockchain address into a copy of the document;
   generating, for the document, the first record in a first format, the first format comprising:
     an integrity verification code (IVC) field comprising an IVC portion; and
     a linked record locator field;
   wherein the first record comprises:
     a first IVC value in the IVC portion of the first record, wherein the first IVC value is for the copy of the document having the blockchain address entered therein; and
     a linked record value in the linked record locator field of the first record, wherein the linked record value indicates a blockchain address of a second record, different than the first record, wherein the blockchain address of the second record indicates a location of the second record within the blockchain, wherein the location of the second record is within a second block that is prior to the first block in the blockchain, wherein the linked record value includes a block identifier of the second block, and wherein the linked record locator field does not link blocks of the first blockchain; and
   generating, in the blockchain, a first block comprising the first record, wherein the first block is chained to a prior block in the blockchain using a second IVC value.

2. A method of using a first blockchain to generate evidence for proving document integrity, the method executable by a processor, the method comprising:
   reserving a blockchain address in a first block for a first record for a document; entering the blockchain address into a copy of the document;
   generating, for the document, the first record in a first format, the first format comprising:
     an integrity verification code (IVC) field comprising a first IVC portion; and a linked record locator field;
   wherein the first record comprises:
     a first IVC value in the first IVC portion of the first record; and
     a first linked record value in the linked record locator field of the first record; and generating, in the first blockchain, the first block comprising the first record,
   wherein the first linked record value indicates a location of a blockchain address of a second record, different than the first record, wherein the blockchain address of the second record indicates a location of the second record within the blockchain, wherein the location of the second record is within a second block that is prior to the first block in the first blockchain, wherein the first linked record value includes a block identifier of the second block, and wherein the linked record locator field does not link blocks of the first blockchain.

3. The method of claim 2
   wherein the IVC field further comprises a second IVC portion,
   wherein the first record further comprises a second IVC value in the second IVC portion,
   wherein the second IVC value represents a same document as the first IVC value, and
   wherein the second IVC value represents an output of a different integrity verification function than the first IVC value.

4. The method of claim 3 further comprising:
generating the second record in the first format;
wherein the second record comprises:
- a third IVC value in the first IVC portion of the second record; and
- a fourth linked record value in the linked record locator field of the second record, wherein the fourth linked record value indicates a location of a fifth record in the first blockchain, thereby linking the first record with the fifth record in a daisy chain.

5. The method of claim 4 wherein the first linked record value comprises at least a portion of the third IVC value.

6. The method of claim 2 wherein the first IVC value comprises at least a portion of a Secure Hash Algorithm (SHA) message digest, and wherein the SHA message digest is generated by at least one function selected from the list consisting of:
SHA-1, SHA-224, SHA-256, SHA-384, and SHA-512.

7. The method of claim 2 wherein the first format further comprises a timestamp field, wherein the first record further comprises a timestamp value in the timestamp field.

8. The method of claim 2 wherein the first format further comprises a generator version field, and wherein the first record further comprises generator version information in the generator version field.

9. The method of claim 2 wherein the first format has a fixed number of bytes.

10. The method of claim 9 wherein the first format is 256 bytes long.

11. The method of claim 2 wherein the location of the second record is within a second block that is prior to the first block in the first blockchain.

12. The method of claim 11 wherein the first linked record value includes a block identifier of the second block.

13. The method of claim 2 wherein the first record further comprises:
a second linked record value in the linked record locator field of the first record, wherein the second linked record value indicates a location of a third record.

14. The method of claim 13 wherein the location of the third record is within the first blockchain.

15. The method of claim 13 wherein the location of the third record is within a second blockchain.

16. The method of claim 13 wherein the first record further comprises:
a third linked record value in the linked record locator field of the first record, wherein the third linked record value indicates a location of a fourth record.

17. The method of claim 2 wherein the first format further comprises an index field, and wherein the first record further comprises a first index value in the index field of the first record.

18. The method of claim 17 wherein the second record further comprises a second index value in the index field of the second record.

19. The method of claim 18 wherein the first linked record value comprises at least a portion of the second index value.

20. The method of claim 17 wherein the first linked record value comprises a blockchain address.

21. One or more computer storage devices having computer-executable instructions stored thereon for using a blockchain to generate evidence for proving document integrity, which, on execution by a computer, cause the computer to perform operations comprising:
reserving a blockchain address for a first record for a document; entering the blockchain address into a copy of the document;
generating, for the document, the first record in a first format, the first format having a fixed number of bytes and comprising:
an integrity verification code (IVC) field comprising an IVC portion;
an index field; and
a linked record locator field;
wherein the first record comprises:
a first IVC value in the IVC portion of the first record;
a first index value in the index field of the first record;
a first linked record value in the linked record locator field of the first record; and
a second linked record value in the linked record locator field of the first record; and
generating a second record in the first format, wherein the second record comprises:
a second IVC value in the IVC portion of the second record, wherein the first and second IVC values each comprises at least a portion of a Secure Hash Algorithm (SHA) message digest; and a second index value in the index field of the second record;
a third linked record value in the linked record locator field of the second record;
a fourth linked record value in the linked record locator field of the second record; generating, in the blockchain, a first block comprising the first record;
generating, in the blockchain, a second block comprising the second record, wherein the first linked record value indicates a blockchain address of the second record in the blockchain, wherein the second block appears prior to the first block in the blockchain;
generating, in the blockchain, a third block comprising a third record, wherein the third block appears prior to the first block in the blockchain, wherein the second linked record value indicates a blockchain address of the third record in the blockchain, wherein the third linked record value indicates a location of a fourth record in the blockchain and the fourth linked record value indicates a location of a fifth record in the blockchain, thereby linking the first record with the second record, the third record, the fourth record, and the fifth record in a daisy chain, and wherein each blockchain address indicates at least a block and an index value of a linked record, and wherein the linked record locator field does not link blocks of the first blockchain.

* * * * *